(12) United States Patent
Segall et al.

(10) Patent No.: US 8,493,943 B1
(45) Date of Patent: Jul. 23, 2013

(54) GEOGRAPHICAL COMMUNICATIONS NETWORKING SYSTEM AND METHOD

(75) Inventors: Ilana Segall, Haifa (IL); Adrian Segall, Haifa (IL); Judith Zelicovici, Haifa (IL)

(73) Assignee: Elbit System Ltd., Haifa (IL)

( * ) Notice: Subject to any disclaimer, the term of this patent is extended or adjusted under 35 U.S.C. 154(b) by 1234 days.

(21) Appl. No.: 11/645,436

(22) Filed: Dec. 26, 2006

(30) Foreign Application Priority Data

Dec. 29, 2005 (IL) .......................................... 172915

(51) Int. Cl.
*H04W 4/00* (2009.01)
(52) U.S. Cl.
USPC ............ 370/338; 370/349; 370/351; 370/431
(58) Field of Classification Search
USPC .................................. 370/338, 349, 351, 431
See application file for complete search history.

(56) References Cited

U.S. PATENT DOCUMENTS

| | | | |
|---|---|---|---|
| 5,652,751 A | 7/1997 | Sharony | |
| 6,304,556 B1* | 10/2001 | Haas | 370/254 |
| 6,744,740 B2* | 6/2004 | Chen | 370/255 |
| 6,791,949 B1 | 9/2004 | Ryu et al. | |
| 6,807,165 B2 | 10/2004 | Belcea | |
| 6,816,460 B1 | 11/2004 | Ahmed et al. | |
| 6,850,524 B1 | 2/2005 | Troxel et al. | |
| 6,973,053 B1* | 12/2005 | Passman et al. | 370/310 |
| 7,158,484 B1* | 1/2007 | Ahmed et al. | 370/254 |
| 7,177,295 B1* | 2/2007 | Sholander et al. | 370/338 |
| 7,746,866 B2* | 6/2010 | Taha et al. | 370/394 |
| 7,764,706 B2* | 7/2010 | Tavli et al. | 370/444 |
| 2002/0114286 A1 | 8/2002 | Iwamura et al. | |
| 2003/0033394 A1* | 2/2003 | Stine | 709/222 |
| 2004/0018839 A1* | 1/2004 | Andric et al. | 455/433 |
| 2004/0022224 A1* | 2/2004 | Billhartz | 370/338 |
| 2004/0205105 A1* | 10/2004 | Larsson et al. | 709/200 |
| 2004/0264403 A1 | 12/2004 | Fette et al. | |
| 2005/0117526 A1* | 6/2005 | Melnik | 370/254 |

OTHER PUBLICATIONS

Guba, Nalinrat Krittiyanot and Camp, Tracy; "GLS: A Location Service for an Ad Hoc Network" Computer Sciences, Colorado School of Mines, Golden, Colorado, published before Nov. 9, 2006.
Pei, Guangyu, Gerla, Mario and Hong, Xiaoyan; "Lanmar: Landmark Routing for Large Scale Wireless Ad Hoc Networks With Group Mobility" Computer Science Department, University of California, Los Angeles, California, published before Nov. 9, 2006.

(Continued)

*Primary Examiner* — Patrick Edouard
*Assistant Examiner* — Aung Win
(74) *Attorney, Agent, or Firm* — Lathrop & Gage LLP

(57) ABSTRACT

An ad-hoc network comprising multiple nodes in, each node including a transmitter, a receiver, a tactical database, storing a partition of the geographical area into multiple cells, each cell is associated with coordinates in a geographical coordinate system, storing tactical data the nodes, a geographical cell processor for identifying the geographical position of the node in associating the node with one of the geographical cells, a situation awareness and collision avoidance messages processor for transmitting/receiving situation awareness messages, the situation awareness messages include the node identification representation, the node geographical position and the node protocol information the node, together with additional of the nodes being defined as cell members of the geographical cell, the cell-member is determined a cell-representative for the geographical cell, the cell-representative, transmits cell-representative messages, to nodes that are within a determined distance from the cell-representative including information relating to the cell-members of a geographical cell.

11 Claims, 13 Drawing Sheets

OTHER PUBLICATIONS

De Rango F., et al., "A Scalable Routing Scheme With Dense Wireless Ad Hoc Networks," Computer & Electrical Engineering, XX, XX vol. 32, No. 1-3, Apr. 19, 2006.

Choo-Chin Tan et al: "Multicast in Mobile Backbone Based As Hoc Wireless Networks", Wireless communications and Networking Conference, 2006. WCNC 2006. IEEE Las Vegas, NV, USA Apr. 3-6, 2006, Piscataway NJ, USA, IEEE, Apr. 3, 2006, pp. 703-708.

Chau Giu et al: "Scalable Multicast in Mobile Ad Hoc Networks" INFOCOM 2004. 23rd Annual Joint Conference of the IEEE Computer and Communications Societies, IEEE, Piscataway, NJ, USA, vol. 3, 7 Mar. 2009, pp. 2119-2129.

Jaikeo C et al: "Adaptive Backbone-Based Multicast for Ad Hoc Networks" Proceedings of IEEE International Conference on Communications—Apr. 29-May 2, 2002—New York, NY, USA, IEEE Piscataway, NJ, USA, vol. 5, Apr. 28, 2002, pp. 3149-3155.

* cited by examiner

GEOGRAPHICAL COMMUNICATIONS NETWORKING SYSTEM AND METHOD

RELATED APPLICATION

This application claims priority to Israeli Patent Application Serial Number 172915, filed Dec. 29, 2005, the disclosure of which is incorporated herein by reference.

FIELD OF THE DISCLOSED TECHNIQUE

The disclosed technique relates communications, in general, and to methods and systems for communicating between mobile nodes in particular.

BACKGROUND OF THE DISCLOSED TECHNIQUE

Communications networks are known in the art. An ad-hoc network is a network formed by wireless hosts without a pre-existing infra-structure. The participants in the network, known as nodes, communicate between each other directly or via other nodes (i.e., a node may perform the operation of a router). Nodes in ad-hoc networks, may arrange themselves in clusters of nodes. The nodes in each cluster select a cluster-head from the nodes in the cluster. The cluster head may be operative to route message between the nodes in the cluster and the nodes in other clusters. Nodes may leave or join the cluster. Therefore, the number of nodes in a cluster may vary. The node designated as the cluster-head may change. For example, the current cluster-head of the cluster leaves the cluster or the network. A new cluster-head will be selected from the remaining nodes in the cluster.

Reference is now made to FIG. 1, which is a schematic illustration of a simple exemplary wireless ad-hoc network, generally referenced 10, which is known in the art. Network 10 includes nodes 12, 14, 16, 18, 20, 22, 24, 26. Nodes 12, 14, 16 and 18 form a cluster, and node 12 is designated as a cluster head and router. Nodes 20, 22, 24 and 26 form another cluster, and node 20 is designated as a cluster-head and router. The dashed line, connecting the nodes, indicates that the nodes communicate with each other, but are not physically connected.

For example, node 16 desires to communicate information to node 26. Node 16 will communicate the information to router 12, router 12 will communicate the information to router 20 and router 20 will communicate the information to node 26. The path or route from node 16 to 26 traverses through routers 12 and 20. In another example, node 14 wishes to communicate information to node 18. Since these two nodes belong to the same cluster therefore node 14 will transmit directly to node 18.

US patent application publication 2002/0112286 A1 to Iwamura et al, entitled "Network Construction Method and Communication System for Communicating Between different Groups Via Representative Devices Of Each Group" directs to establishing a communication network consisting of nodes, arranged in clusters. Associated with each cluster is a cluster-heads. Initially, each node broadcasts a message containing information about itself (e.g., an identification number) and other nodes from which the broadcasting node received a message. Consequently, each node knows about other nodes, from which it can receive a message. The technique divides the network to clusters of several nodes. The nodes in each cluster can communicate with each other. A cluster-head is selected from among the nodes in the cluster. The cluster-head communicates with cluster-heads of other clusters. Consequently, a node, belonging to one cluster, may send a message to a node in another cluster. The receiving node may send a message to the transmitting node, acknowledging the reception of the message. The information about routes to different nodes is stored in each node.

Iwamura et al, further direct to a technique in which a cluster-head identifies a new node joining the network, and identifies a route to that node when the new node is not in the cluster of the cluster-head. The technique further provides means to detect if a message reached the destination, the message is destined thereto. Iwamura et al, further direct to a technique in which nodes may detect nodes of other clusters in the surroundings of the node.

U.S. Pat. No. 6,744,740 to Chen entitled "Network Protocol for Wireless Devices Utilizing Location Information" directs to a technique in which nodes, in an ad-hoc network, are arranged in clusters with designated cluster-heads. A cluster-head is cognizant of the position of the nodes in the own cluster of the cluster-head. A designated node, not necessarily the cluster-head, functions as a gateway between different clusters. The gateway relays messages between cluster-heads. The information may include the position of the cluster-head and the positions of the nodes in the cluster. Cluster-heads periodically exchange information about other clusters. Therefore, all the cluster-heads in the network are informed of all the other clusters.

A node, required to send a message to another node, creates a list of all the nodes within a number of hops away. If the other node is in the list, then the node will forward the message to the other node. The node forwards the message directly or via an intermediate node. If the node forwards the message via intermediate nodes, then, the node selects the node with the shortest distance to the destination as the next node. If the other node is not in the list, then the node will send a query to cluster-head of the node thereof. The cluster-head will query other cluster-heads in the network. Thus, a route to the destination node is discovered.

Reference is now made to a publication to N. K. Guba and T. Camp, entitled "GLS: a Location Service for an Ad Hoc Network", in Proceedings of the Grace Hopper Celebration (GHC '02), 2002. This publication is directed to an ad hoc network, wherein each node, maintains the geographical position thereof, using a GPS. Each node utilizes Grid Location Service (i.e., GLS) to forward messages to other nodes in the network. In this GLS, the network coverage area is initially arranged into a hierarchy of grids with squares of increasing size. The smallest square is called an order-1 square. Four order-1 squares form an order-2 squares etc. Each node selects a location server in each of its neighboring squares of any order. When a node needs a location for a destination, it initiates a location query request to a potential location server of the destination node, in the requesting node order-2 square. The receiving node sends the query to the servers of a neighboring higher order squares using the same method. The process is repeated until the query reaches the GLS selected by the destination node. The receiving GLS sends the message to the destination node. The destination node responds to the query by sending its most recent location using this same method. When a node moves it sends a location update to all of its location servers. When a node moves to a different square it leaves, in its old square, a pointer to the new square of the node.

U.S. Pat. No. 5,652,751 to Sharony entitled "Architecture for Mobile Radio Networks with Dynamically Changing Topology Using Virtual Subnets" Directs to a radio network, having nodes that are subject to dynamically changing topology, wherein, the nodes are grouped into physical subnets and virtual subnets. A physical subnet is a group of nodes, in relatively close proximity to one another, in a defined local geographical area. A virtual subnet is a subnet affiliating each node in a physical subnet, with a corresponding node in each of the other physical subnets. The network identification representation (e.g., ID number) is composed of the physical subnet number and the next greatest possible address within the physical subnet. Each node in the network is updated with the current addresses, used in its physical and virtual subnets, by advertising processes using a dedicated management channel. Routing a message from a source node to a destination node is achieved by first sending the message to an intermediate node, affiliated with the destination node (i.e., in the same virtual subnet of the destination node), within the physical network of the source node. The intermediate node sends the message to the destination node over the virtual subnet.

U.S. Pat. No. 6,807,165, to Belcea entitled "Time Division Protocol for an Ad-Hoc, Peer-to-Peer Radio Network Having Coordinating Channel Access to Shared Parallel Data Channels with Separate Reservation Channel" directs to an ad-hoc network, wherein, each node has full information about all activities of other nodes. The nodes access the channel according to a combination of Time Division Multiple Access (i.e., TDMA), Frequency Division Multiple Access (i.e., FDMA) and Code Division Multiple Access (i.e., CDMA). A configuration channel, for transmitting configuration data (e.g., connectivity and data transfer plans), is reserved at a certain frequency. Nodes access the configuration channel according to a TDMA scheme. Using received messages, a node creates a utilization map and computes the required transmit power. Initially, the node transmits a message in the last time slot of a time frame. The message includes the utilization map of the node and a request to register with the closest node to the transmitting node. In the utilization map, the node marks the time slot it intends to move to in the next frame. A node transmits a message to another node over a route that will result in expending the least amount of energy. The route is determined according to a tree stored in each node.

U.S. Pat. No. 6,816,460 to Ahmed et al. entitled "Location Based Routing for Mobile Ad-Hoc Networks" directs to an ad-hoc network wherein each node transmits a periodic pilot signal. This pilot signal includes the location information of the transmitting node. Using the location information received from other nodes, a node constructs a point-to-point links to other nodes within a hearing distance from the node. In one embodiment of the publication to Ahmed et al, each node knows the location-(accurate or approximate) of every other node in the network. Each node periodically transmits this information to its direct neighbors. The neighbors transmit the information to their neighbors. When a node is required to transmit a message to a node with which it does not have a point-to-point link, the node transmits to an intermediate node closest to the destination node. That node sends the message either to the destination node or to another intermediate node closer to the destination node.

Reference is now made to the article by G. Pei, M. Gerla and X. Hong, entitled "LANMAR: Landmark Routing for Large Scale Wireless Ah Hoc Networks With Group Mobility" in Proceedings of IEEE/ACM Workshop on Mobile Ad Hoc Networking & Computing (MobiHoc 2000), pp 11-18, August 2000. This article directs to a technique wherein nodes forming a logical group of nodes (e.g., a brigade, soldiers in a battle field) select a landmark node representing the logical group of nodes. Thus, each node in the network is associated with a landmark. Each node in the network exchange routing information with the nodes in the local area of the node known as the fisheye scope. For example, the fisheye scope of a node may be all the one-hop and two-hop neighbors of the node. The routing information includes routes to the nodes in the local area of the node and routes to the different landmarks in the network. A node sends a message to another node in the fisheye scope of the node according to the routing table stored in the node. A node sends a message to another node, not in the fisheye scope of the node by first directing the message to the landmark of the other node. When the message reaches an intermediate node, and the destination node is within the fisheye scope of the intermediate node, the intermediate node forwards the message directly to the destination node, according to the routing table stored in the intermediate node.

SUMMARY OF THE PRESENT DISCLOSED TECHNIQUE

It is an object of the disclosed technique to provide a novel method and system for a geographical network including a plurality of nodes.

In accordance with the disclosed technique, there is thus provided a geographical wireless ad-hoc communication network including a plurality of nodes situated in a geographical area. Each of the nodes includes a transmitter, a receiver, a tactical data base, a geographical cell processor and a situation awareness message. The geographical cell processor is coupled with the transmitter, with the receiver and with the tactical database. The situation awareness and collision avoidance messages processor is coupled with the transmitter, with the receiver and with the tactical database. The transmitter transmits messages over at least one transmission channel. The receiver receives messages over the at least one transmission channel. The tactical database, stores a partition of the geographical area into a plurality of cells. Each of the cells is associated with coordinates in a geographical coordinate system. The tactical database further stores tactical data of the respective node and tactical data of others of the nodes. The geographical cell processor identifies the geographical position of the node in the geographical coordinate system. The geographical cell processor is further operative to associate the node with one of the geographical cells according to the geographical position of the node. The situation awareness and collision avoidance messages processor periodically transmits via the transmitter, situation awareness messages and periodically receives situation awareness message of other nodes, via said receiver situation awareness message of other nodes. The situation awareness messages include at least the identification representation of the node, the geographical position of the node and the protocol information of the node. The node, together with additional nodes, all associated with a certain one of the geographical cells, are defined as cell members of the geographical cell. One of the cell-members is determined a cell-representative for the geographical cell. The cell-representative transmits cell-representative messages, to nodes that are within a determined distance from the cell-representative. The cell-representative messages at least include information relating to the cell-members of the certain one geographical cell.

In accordance with another aspect of the disclosed technique, there is thus provided a node a geographical wireless ad-hoc network including a plurality of nodes, the node includes a transmitter, a receiver, a tactical database, a geographical cell processor and a situation awareness and collision avoidance messages processor. The geographical cell processor is coupled with the transmitter, with the receiver and the tactical database. The situation awareness and collision avoidance messages processor is coupled with the transmitter, with the receiver and with the tactical database. The transmitter transmits messages over at least one transmission channel. The receiver receives message over the at least one transmission channel. The tactical database stores a partition of the geographical area into a plurality of cells. Each of the cells is associated with coordinates in a geographical coordinate system. The tactical database further stores the position of the node and the position of other the nodes in the geographical coordinate system. The geographical cell processor identifies the geographical position of the node in the geographical coordinate system, associates the node and the other nodes with a respective one of the geographical cells according to the geographical position of the nodes. The geographical cell processor further determines node as a cell-representative of the respective geographical cell and determines the next cell-representative of the respective geographical cell when the node is the cell-representative. The situation awareness and collision avoidance messages processor periodically transmits, via the transmitter, situation awareness messages and periodically receives situation awareness message of other nodes, via said receiver. The situation awareness messages at least include the identification representation of the node, the geographical position of the node and the protocol information of the node. The geographical cell processor, once determined the node as a cell-representative, transmits via the transmitter a cell-representative message to nodes that are within a determined distance from the node. The cell-representative messages at least include information relating to the node and relating to additional nodes, all associated with the same respective cell of the node, thereby defining cell-members.

In accordance with a further aspect of the disclosed technique, there is thus provided a method for operating a node in a geographical wireless ad-hoc network, the network includes a plurality of nodes situated in a geographical area, the method includes the procedures of identifying the geographical position of the node in a geographical coordinate system and a geographical cell associated therewith, the geographical cell being a single part of a partition of the geographical area into a plurality of cells. Periodically transmitting a situation awareness message when the geographical position of the node is identified. The situation awareness message includes at least the identification representation of the node, the geographical position of the node and the protocol information of the node. Receiving cell-representative messages, when the geographical position is identified. The cell-representative messages are transmitted by a cell-representative. The cell-representative being determined from the nodes, all associated with a certain one of the geographical cells thereby defining cell-members. The cell-representative messages at least include information relating to the cell-members. Detecting the cell-representative status of the node, when the geographical position is identified. Determining the next cell-representative when the cell-representative status of the node is detected positive. Transmitting a cell-representative messages, over at least one transmission channel, when the next cell-representative is determined and repeating from the procedure of identifying the geographical position. The cell representative message are transmitted to nodes that are within a determined distance from the cell-representative. Determining the node as the next cell-representative when the cell-representative status of the node is detected negative and when self-determining criteria are met and repeating from the procedure of identifying the geographical position.

In accordance with another aspect of the disclosed technique, there is thus provided a method for transmitting a situation awareness message in a geographical ad-hoc network, including a plurality of nodes. The situation awareness message informs other nodes about the transmitting node. The method comprises the procedures of selecting a set of time slots in a global frequency, thereby defining a situation awareness channel for periodically transmitting the situation awareness message. The situation awareness message includes at least an identification representation associated with the node, the geographical position of the node and protocol information associated with the node. The geographical position is defined in a geographical coordinate system. The time slots and the global frequency are defined in a TDMA combined with an FDMA multi access scheme and associated with each node is an identification representation. Defining a first Request To Send (RTS) interval and a first data interval within each of the selected time slots. Detecting the transmission of RTS messages by other nodes, during the first RTS interval, and transmitting an RTS message during a random interval within the first RTS interval, the RTS message at least includes a selected priority. Determining the success of the RTS. Receiving a situation awareness message of another node during the first data interval in each of the selected time slots, when the RTS is determined unsuccessful and transmitting a situation awareness message, during the first data interval, when the RTS is determined successful.

In accordance with a further aspect of the disclosed technique, there is thus provided a method for transmitting an addressed message from a current node to another node, in a wireless ad-hoc network method, the network includes a plurality of nodes situated in a geographical area. The method comprises the procedures of determining the routing status of the current node. The routing status of a node is selected from the grou consisting of message-source-node, routing-node or message-destination node. Selecting a current transmission channel for transmitting the addressed message when the routing status of the node is determined as message-source-node or as routing-node. Ordering the nodes stored in the current node according to a prioritization criterion, when the transmission channel is selected. Selecting a new node with the highest priority, as the next hop node. Selecting a next hop addressed message transmission channel for the next hop node. Transmitting a control message to the next hop node, the control message at least include the current addressed message transmission channel and the next hop addressed message transmission channel. Transmitting the addressed message over the current addressed message transmission channel and detecting the transmission of the addressed message by the next hop node over the next hop addressed message transmission channel.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

Figure 1:
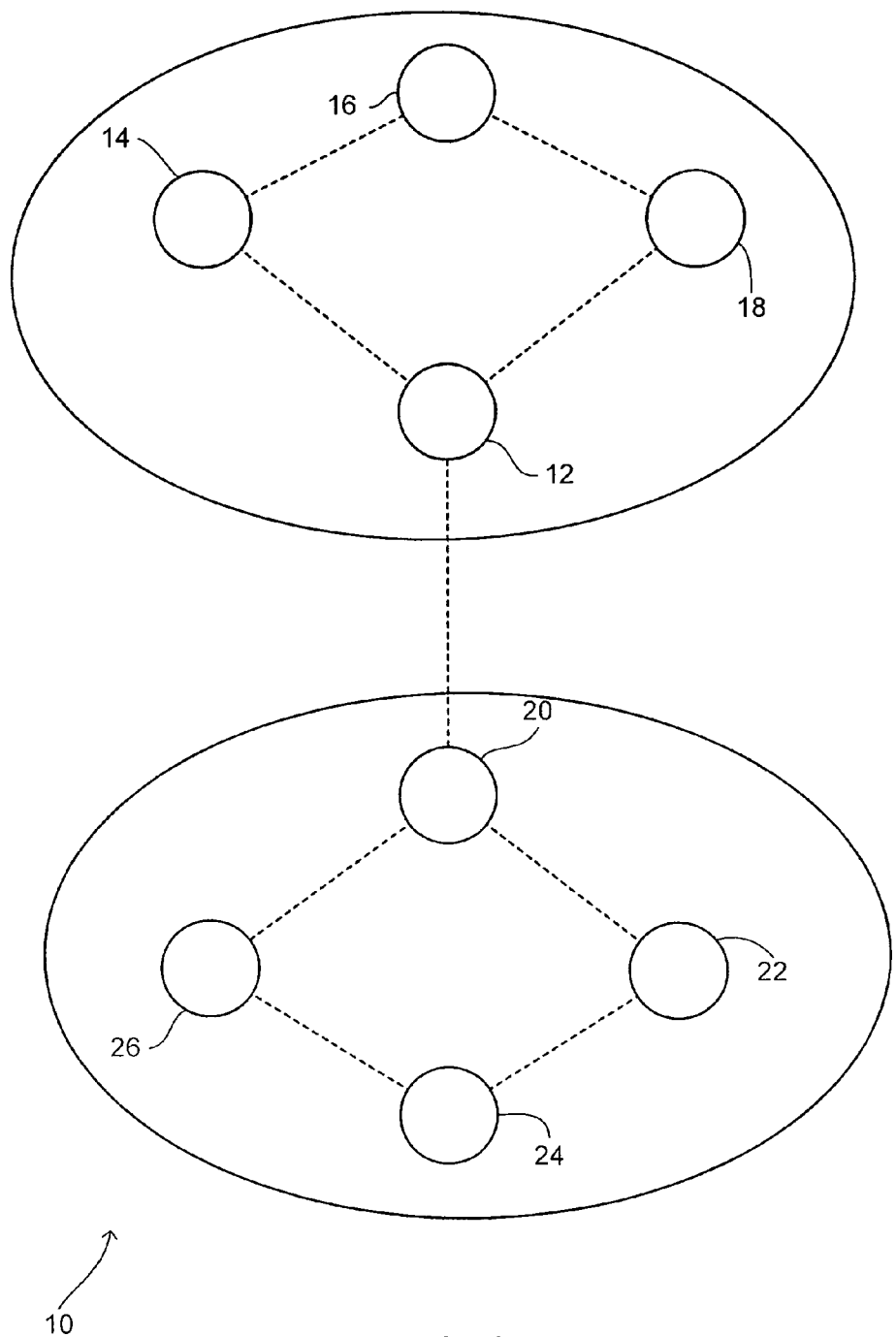
FIG. 1, which is a schematic illustration of a simple exemplary wireless ad-hoc network, generally referenced 10, which is known in the art.

The disclosed technique overcomes the disadvantages of the prior art by providing communication system and method, between mobile nodes, by ad-hoc geographical clustering. Nodes in the same geographical region form a cluster of nodes. Each node, which enters a predetermined geographical cluster area, called cell, becomes a member of that cluster, associated with that cell, either as a cell-member or as a cell-representative. Nodes transmit messages to different ranges at different power rates according to the purpose of the message.

A plurality of nodes may attempt to transmit simultaneously. Therefore, a media-access scheme is needed to schedule the transmission of a plurality of nodes. In accordance with the disclosed technique, Time Division Multiple access (i.e., TDMA) combined with Frequency Division Multiple Access (i.e., FDMA) is used to schedule the transmission of different nodes. In a TDMA and FDMA media-access scheme, a transmission cycle (e.g., one second) is divided into a plurality of transmission frames (e.g., one-hundred milliseconds each). Each transmission frame is further divided into a plurality of time slots. Nodes may transmit at the same time slot over a different transmission frequency. Therefore, a transmission channel is identified as a combination of time slot and frequency. Different transmission frequencies have different roles (e.g., a global transmission frequency, on which all of the nodes attempt to receive). In a transmission frame, one or more time slots are dedicated to a particular purpose. For example, one type of a dedicated time slot is a control time slot. A control time slot is a slot in which nodes transmit control messages, thereby establishing direct communications with one another.

The coverage area of the network is divided into geographical regions, also called cells. Each cell is associated with a pair of indices and an identification representation. This pair of indices is the set of coordinates, defining the position of the center of the cell, in a reference coordinate system associated with the coverage area of the network. The reference coordinate system can be registered with a geographical coordinate system, such as WGS-84. Thus the indices of the cells are uniquely related to a set of geographical coordinates. Therefore, the position of a node, in the geographical coordinate system, has a unique transformation to the indices of the cell that that node is associated therewith. This division and the reference coordinate system are stored in a tactical database inhered in each node.

Nodes, within a geographical cell, form a cluster of nodes. A node in a cell may be a cell-member or a cell-representative. A cell-representative is selected from the cell-members. Each cell-representative node broadcasts cell-representative messages at a cell-representative transmission power and cell-representative transmission rate over a channel (time slots and frequency) determined by the cell identification representation. The term "cell-representative transmission power" is directed at a transmission power for reception by nodes which are located within a predetermined distance from the transmitting cell-representative (e.g., several cells away, several hundred kilometers). A cell-representative rate is, for example, once every transmission cycle. These cell-representative messages include the identification representation of the cell-representative (e.g., ID number), the identification representation of cell-members of that cell, and of cell-members of neighboring cells. The cell-representative message may further include tactical information of the cell-members of the respective cell, and of cell-members of neighboring cells. These neighboring cells are selected according to some prioritizing criterion (e.g., selecting the neighboring cells in a continuously repeating sequence, according to the order those cells are stored in the tactical database). Each node, receiving a cell-representative message, stores the information contained in this message in the tactical database of the node.

Each cell is associated with a unique combination of a transmission frequency and a plurality of transmission time slots, in which the respective cell-representative transmits a cell-representative message. This unique combination of a transmission frequency and transmission time slots will be referred to hereinafter as cell-representative channel. This cell-representative channel is uniquely determined according to the indices of the cell.

Every node in a cell, including the cell-representative, transmits Situation Awareness (SA) messages on a global transmission frequency. These SA messages are transmitted at an SA transmission power, and at an SA transmission rate. The SA transmission power is sufficient for a node, at a defined SA-range to receive that SA message. These SA messages, inform other nodes within the SA-range, about the transmitting node. Typically, SA-range is equal to the maximum width of a cell (i.e., diameter). Each node transmits its SA messages on an allocated set of time slots (e.g., two time slots in a transmission cycle). These slots form an SA-channel. Slots allocation, for SA messages, is performed dynamically and in a distributed manner. Each node requests the allocation of an SA-channel for transmitting the SA message, by sending a Request To Send (RTS) message. The node transmitting the RTS message, assigns a priority to that RTS message. The SA-channel is allocated to the node transmitting the RTS message with the highest priority. The node retains the allocated SA-channel, for the next transmission cycle, unless a transmission collision with another node is detected on one of the time slots of that SA-channel.

An SA message includes the identification representation of the node, the position of the node, protocol information, tactical information and the time in which the information was updated. The information received from these SA messages is stored in the tactical database of the node. Protocol information includes the acquired set of time slots, the cell-representative status of the node (i.e., whether the transmitting node is a cell-representative or not) and whether the node received cell-representative messages. Protocol information may further include detected hidden terminals, if any were detected. A hidden terminal is a situation wherein, a node receives two RTS messages, over the same SA-channel, from two other nodes, that cannot receive each other. The receiving node issues an "SA collision warning" in the protocol record of the next SA message thereof. Thus, the two other nodes cease to transmit SA messages over that SA-channel A node further transmits Collision Avoidance (CA) messages. CA messages are SA messages transmitted at CA transmission power and at CA transmission rate. The CA transmission power is sufficient for a node, at a defined CA-range to receive that CA message. CA-range is defined as a range where a threat of a physical collision with another node can be detected but this collision can still be avoided. CA message is transmitted, for example, ten times every transmission cycle. The CA message is transmitted on a set of slots that form a CA-channel. This CA-channel is randomly selected, when needed (i.e., a node within CA range is detected), and is acquired in the same manner as the SA-channel. However, the node does not retain this CA-channel, for the next transmission cycle, after the CA message was transmitted.

Each node in the network is operative to transmit addressed messages to other nodes. These addressed messages are transmitted over unoccupied SA transmission channels. The addressed message may include information such as text, photos or parts of a database. A node, transmitting an addressed message, referred to hereinafter as the current node (i.e., either as a message source node or as a router node), orders, according to a prioritization criterion (e.g. distance from destination), other nodes stored in the tactical database of the current node. The current node selects the node with the highest priority as the next hop node (i.e., the next hop is either a router node or the destination node) and sends a control message. This control message establishes the communications between the current node and the next hop node. This control message includes the transmission channel of the current node and the transmission channel of the next hop node. The current node transmits the addressed message to the next hop node, on the established transmission channel. After the addressed message is transmitted, the current node attempts to receive the addressed message over the transmission channel selected for the next hop node. The reception of the addressed message, over the transmission channel of the next hop node, serves as an acknowledgement that the message was received and forwarded by the next hop node. When the message reaches the destination node, the destination node transmits an acknowledgement message, as a new addressed message, to the source node.

Each node in the network is operative to transmit digitized voice message. These voice messages are transmitted over dedicated voice channels (VC). Transmission of voice messages is further explained below.

Figure 2:
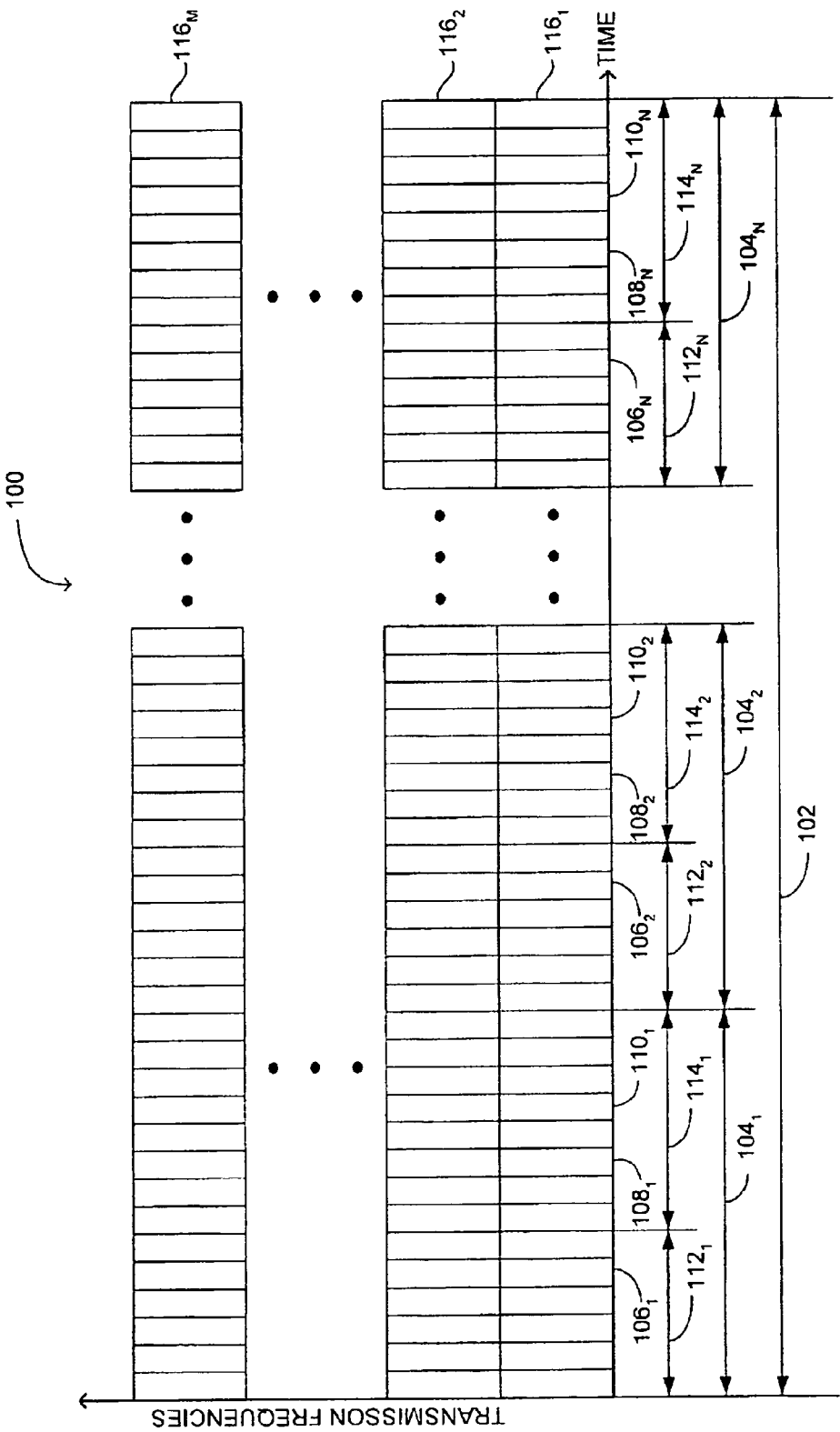
FIG. 2, which is schematic illustration of a TDMA combined with an FDMA multi-access scheme generally referenced 100, used by the system in accordance with an embodiment of the disclosed technique.

Reference is now made to FIG. 2, which is schematic illustration of a TDMA combined with an FDMA multi-access scheme generally referenced 100, used by the system in accordance with an embodiment of the disclosed technique. In a TDMA combined with an FDMA multi-access scheme, time is divided into cycles, typically, a transmission cycle is one second in duration. Interval 102 represents one transmission cycle. Each cycle is further divided into a plurality, N, of frames. In FIG. 2, intervals $104_1$, $104_2$ to $104_N$ represent frames. Each frame is divided into time slots. In FIG. 2, intervals $106_1$, $106_2$ to $106_N$, intervals $108_1$, $108_2$ to $108_N$ and intervals $110_1$, $110_2$ to $110_N$, represent time slots in frames $104_1$, $104_2$ to $104_N$ respectively.

In a TDMA combined with an FDMA multi-access scheme each node may transmit over a plurality, M, of transmission frequencies. In FIG. 2, transmission frequencies $116_1$, $116_2$ to $116_M$, represent different transmission frequencies in which a node may attempt to transmit, in any given time slot. Thus, with reference to the above description of a transmission channel, for example, time slot $108_1$ and frequency $116_1$, form a time slot and frequency combination, defining a transmission channel. Consequently, different nodes are operative to transmit in the same time slot over different frequencies. According to another embodiment of the disclosed technique, the transmission frequencies may by hopping according to a hopping pattern (e.g., pseudo random pattern).

In FIG. 2, transmission frequency $116_1$ is the global transmission frequency. All nodes attempt to receive transmission in the global transmission frequency. Slots $108_1$, $108_2$ to $108_N$ represent control slots. The time slots in intervals $112_1$, $112_2$ to $112_N$, in the respective frames, are the time slots of the respective cell-representative channels. In interval $114_1$, $114_2$ to $114_N$, over global transmission frequency $114_1$, SA and CA messages are transmitted in the slots other than the control slots, for example, slots $108_1$, $108_2$ to $108_N$. Addressed messages and voice messages are transmitted in interval $114_1$, $114_2$ to $114_N$ over the transmission frequencies other then global transmission frequency $116_1$.

In the system according to one example of the disclosed technique, the coverage area of the network is divided into hexagonal cells. It is noted that different configurations of division are possible (e.g., square, triangle), hexagonal cells are brought herewith as an example only.

Figure 3A:
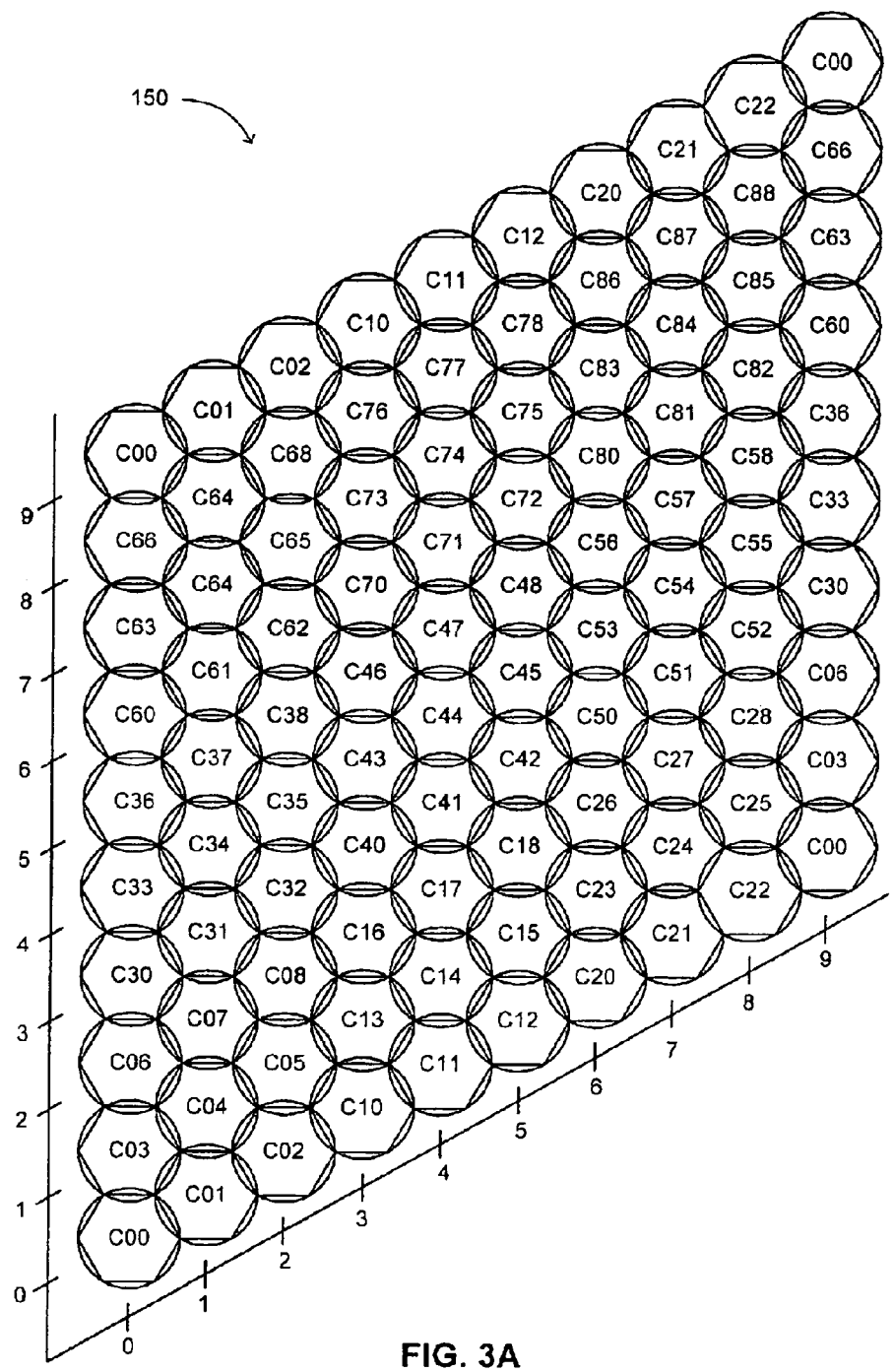
FIG. 3A, which is a schematic illustration of an exemplary network coverage area, generally referenced 150, divided into geographical cells.

Reference is now made to FIG. 3A, which is a schematic illustration of an exemplary network coverage area, generally referenced 150, divided into geographical cells, in accordance with another embodiment of the disclosed technique. The center of each geographical cell is located at a unique set of coordinates in the reference coordinate system. This unique set of coordinates defines the cell indices. Associated with the cell indices, are the representative channels. Each unique set of coordinates, in the reference coordinate system, is associated with a corresponding set of geographical coordinates in the geographical coordinate system. This correspondence is determined according to the geographical coordinates of the origin of the reference coordinate system.

In FIG. 3A, the numbers inside each depicted geographical cell, represent the cell-representative channel of that cell. In the combined TDMA and FDMA media access scheme used, the first digit, of the cell-representative channel, represents the frequency of transmission, and the second digit represents the frame of the cell-representative transmission time slots. For example, the cell located at coordinates [5;6] (i.e., the indices of the cell are 5 and 6) and marked C72. The digit '7' in C72 represents the seventh transmission frequency, for example, transmission frequency $116_7$ (not shown in FIG. 2). The digit '2' represents the second frame. For example, the cell-representative of cell C72 transmits cell-representative messages in the time slots in interval $110_2$ in frame $104_2$ (FIG. 2). The cell-representative channel is uniquely related to the indices of the cell. The cell-representative channel of each cell may be predetermined and stored in memory. The cell-representative channel may further be calculated when needed, for example, prior to transmitting a cell-representative message.

The TDMA and FDMA multi access scheme used in exemplary network 150 includes eighty-one cell-representative channels. These eighty-one cell-representative channels result from nine transmission frequencies, each with nine transmission frames. Therefore, the association of each cell with the cell-representative channel thereof, repeats after nine cells in each axis direction of the reference coordinate system. For example, the cell-representative channel of cell [0;0] (i.e., cell-representative channel COO) is also the cell-representative channel of cell [0;9].

Figure 3B:
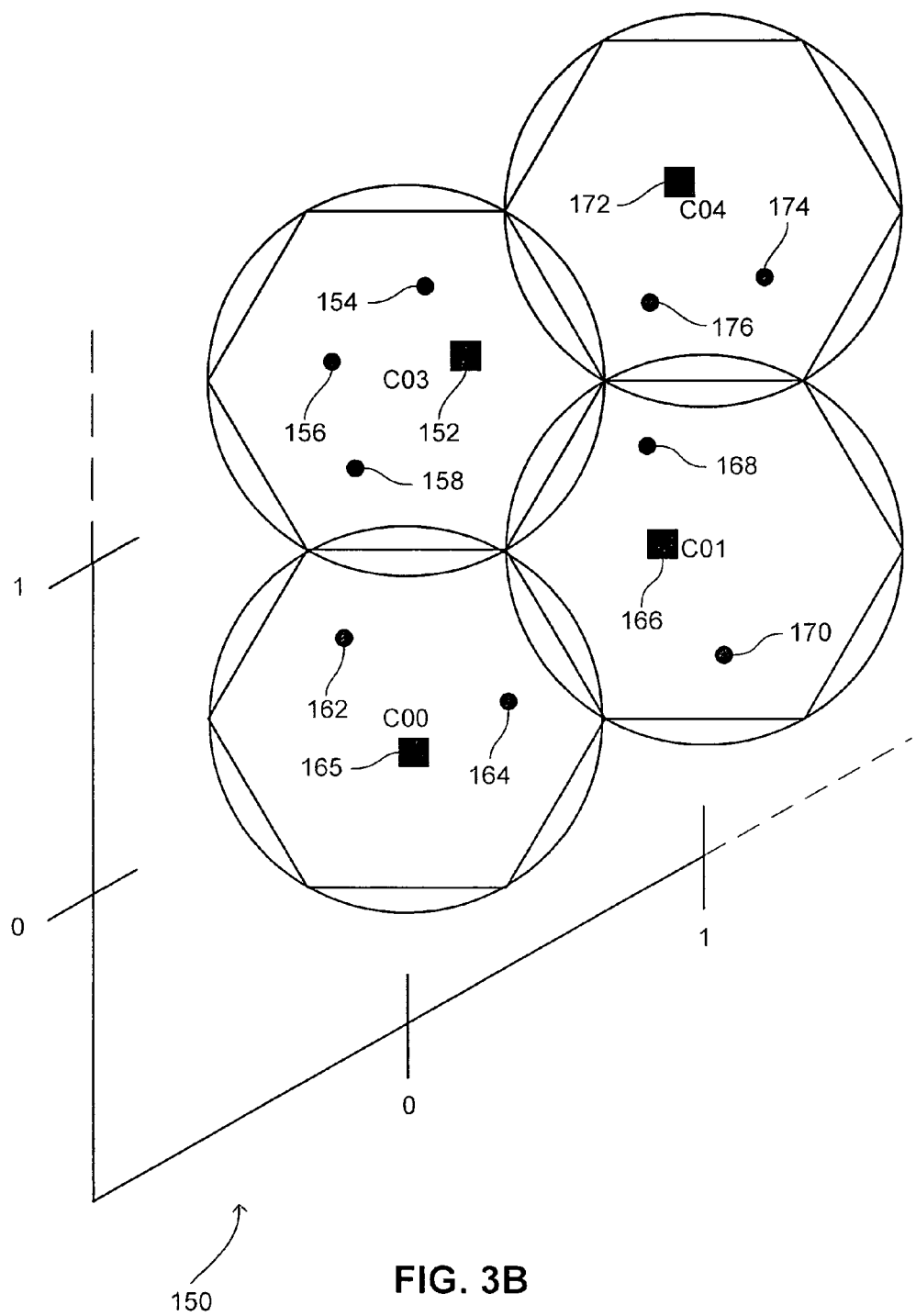
FIG. 3B, which is a schematic illustration of several exemplary geographical cells in network coverage area 150.

Reference is now made to FIG. 3B, which is a schematic illustration of several exemplary geographical cells in network coverage area 150. The cell centered at coordinates [0;1] includes cell-members 154, 156 and 158, designated by a circle and cell-representative 152 designated by a square. The cell centered at coordinates [0;0] includes cell-members 162 and 164, and cell-representative 165. The cell centered at coordinates [1;0] includes cell-members 168 and 170 and cell-representative 166. The cell centered at coordinates [1;1] includes cell-members 174 and 176 and cell-representative 172.

Figure 3C:
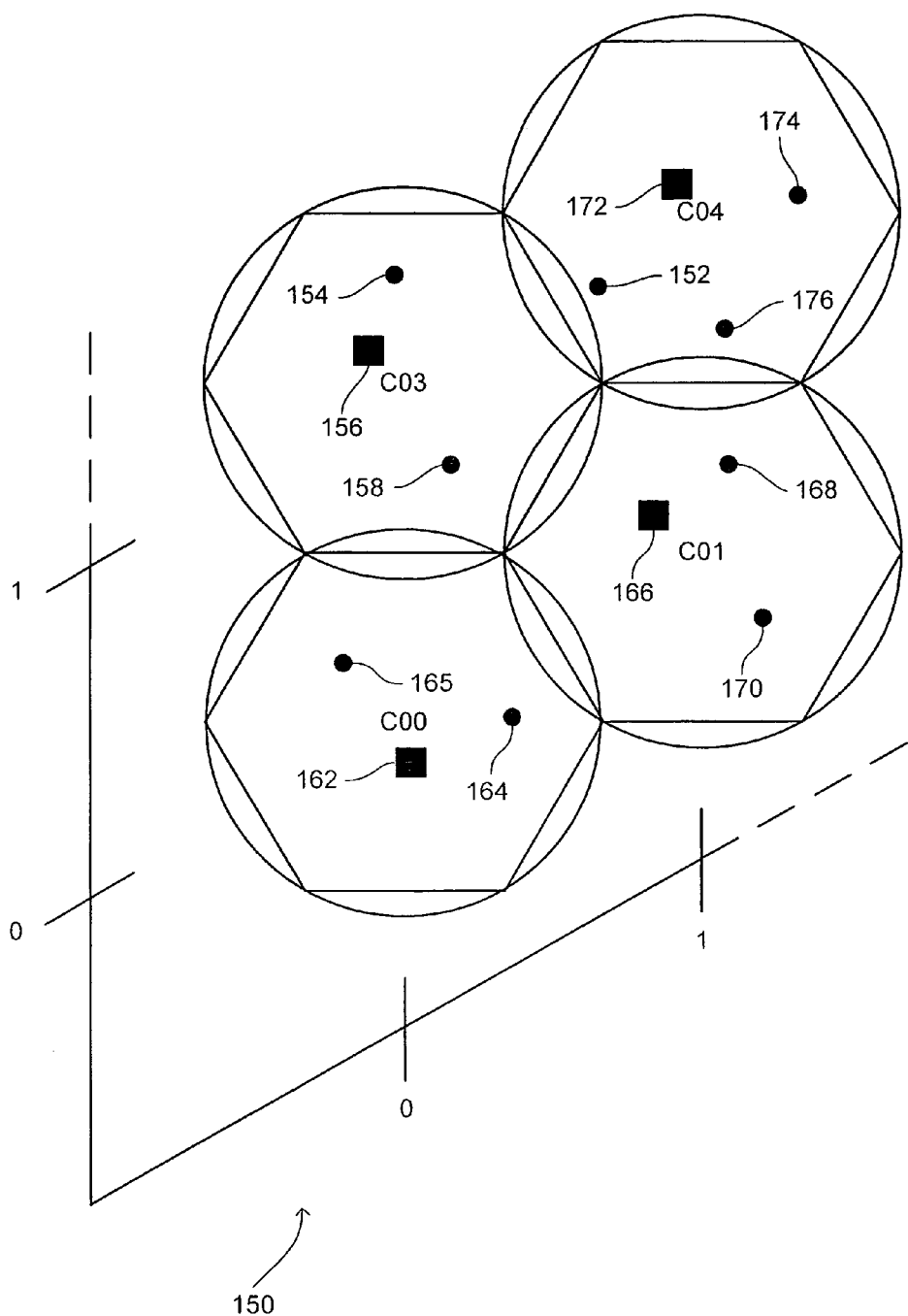
FIG. 3C, which is another schematic illustration of several exemplary geographical cells in network coverage area 150.

Reference is now made to FIG. 3C, which is another schematic illustration of several exemplary geographical cells in network coverage area 150. Here, node 152 moved from the cell centered at coordinates [0;1] to the adjacent cell at coordinate [1;1]. Adjacent cells are defined as two cells, that the absolute value of the difference between one of the indices thereof is at most one, or, that the absolute value of the sum of the difference between the two indices thereof, is also at most one. More concisely:

$$\max(|\delta i|, |\delta j|, |\delta i + \delta j|) = 1 \quad (1)$$

where i and j denote the indices of the cell and $\delta$ denotes the difference operator and |*| represents the absolute value operator.

According to a cell-representative selection protocol cell-representative 156 is the new cell-representative of cell [0;1]. In the cell centered at coordinates [0;0] cell-member 162 has become the cell-representative instead of node 165. A node is considered to have moved to a different cell if the distance between the node and the geographical center of the cell is larger than the radius of the circle bounding the cell.

Each node identifies the indices associated with the respective geographical cell of that node. Each node is operative to identify the geographical position of the node, in the relevant geographical coordinate system. Each node is further operative to perform the transformation from the geographical position, to the position in the reference coordinate system. Consequently, the node identifies the position of the node in the reference coordinate system and the respective cell of the node.

A cell-representative transmits cell-representative messages over the corresponding cell-representative channel. For example, with reference to FIG. 2, a corresponding cell-representative channel can consist of time slots in interval $110_1$ in frame $104_1$ and transmission frequency $116_1$. Each node, receives cell-representative messages transmitted by the cell-representative thereof, and by the cell-representatives of neighboring cells. Consequently, the cell-representatives of these neighboring cells, and the cell-representative of the node, are required to transmit on different cell-representative channels. For example, with reference to FIG. 3A, cell-representative of the geographical cell at coordinate [0;0] should not transmit concurrently with cell [2;0] since cell [1;0] should be able to receive cell [0;0] and cell [2;0]. In the TDMA and FDMA combined multi-access scheme, representative-channels are calculated according to:

$$\text{time frame} = (i \bmod 3 + 3j \bmod 3) \quad (2)$$

where mod denotes the modulo operator and i and j are the indices in the reference coordinate system, of the cell. The transmission frequency of the cell-representative is calculated according to $$\text{frequency} = \left( \left\lfloor \frac{i \bmod (3\sqrt{TransCh})}{3} \right\rfloor + 3 \cdot \left\lfloor \frac{j \bmod (3\sqrt{TransCh})}{3} \right\rfloor \right) \quad (3)$$

where TransCh is the number of transmission frequencies available (e.g., nine different transmission frequencies, as illustrated in FIG. 3A) and the symbol $\lfloor \ \rfloor$ denotes an integer truncating operator.

In addition to transmitting a cell-representative message, at the designated transmission channel, each cell-representative transmits, each transmission cycle, an additional message. These additional messages will be referred to hereinafter as auxiliary messages. Auxiliary messages include information relating to the nodes occupying the cell, (i.e. the identification representation of the cell-members in the respective cell). Auxiliary messages are transmitted, on designated time slots in one of the available transmission frequencies. The transmission channel (i.e., the combination of the time slots and the transmission frequency) in which a cell-representative transmits an auxiliary message, are related to the cell according to equations (2) and (3). More specifically, the result of equation (2) is a pointer to the auxiliary message transmission time slot, rather than the frame used for the cell-representative message transmission. The transmission channel (i.e., the combination of the time slot and the transmission frequency) in which a cell-representative transmits an auxiliary message, will be referred to hereinafter as an auxiliary channel.

Each node maintains a tactical data-base. The tactical data-base stores information about other nodes in the network. The tactical database associates each stored node, with the cell that node was last reported to be in, the time stamp in which that report was received, and role of that node (i.e., cell-member or cell-representative). This time stamp is used to determine if this information is considered updated or obsolete.

Every node in the network, receives cell-representative messages. A node receives the cell-representative messages of the respective cell-representative of the node. A node, further receives cell-representative messages of other cell-representatives. Each node, receives cell-representative messages, according to an interception priority criterion. The node receives the cell-representative, with the highest interception criterion, that transmits in the next frame. Cells, that are members of a group of cells, formed by an interception criterion, are additionally ordered by an ordering criterion (e.g., the distance from the node is an ordering criterion).

The term "updated cell", refers herein to a cell, with corresponding information regarding the nodes in that cell, that the node received this information within a predetermined time period, according to the database of the node. The term "visited cell" refers herein to a cell that is empty according to the database of the node (i.e., there are no database entries relating to nodes in that cell), and the node attempted to receive cell-representative messages there from.

An example of receiving cell-representative messages, according to an interception priority criterion, is brought herein. A node, receives cell-representative messages of the own cell-representative, with the highest priority. The node, receives cell-representative messages, of cells, which are not updated according to the tactical database of the node, or cells with new added nodes, with the second highest priority. The node, intercepts cell-representative messages, of cells that are updated according to the tactical database of the node, with the third highest priority. The node, receives cell-representative messages, of un-visited cells (i.e., cells that were not visited during a predetermined time period) that are empty according the tactical database of the node, with the fourth highest priority. The node, receives the other cell-representative messages, (i.e., visited cells that are empty according to the tactical database of the node), with the fifth highest priority.

A node further prioritizes the cell-representatives, from which that node receives cell representative message, in each priority level, according to a sub-priority criterion. This sub-priority criterion is, for example, the distance of the cell-representative from the receiving node. In this example, the sub-priority decreases as the distance from the receiving node increases.

Each node, receives auxiliary messages, according to an interception priority criterion. Cells, that are members of a group of cells, formed by an interception criterion, are additionally ordered by an ordering criterion.

An example of receiving auxiliary messages, according to an interception priority criterion, is brought herein. A node will attempt to receive auxiliary messages, of un-visited cells that are empty, according to the tactical database of the node, with the highest priority. The node will attempt to receive auxiliary messages, of all other cell-representatives, with the second highest priority.

Figure 4:
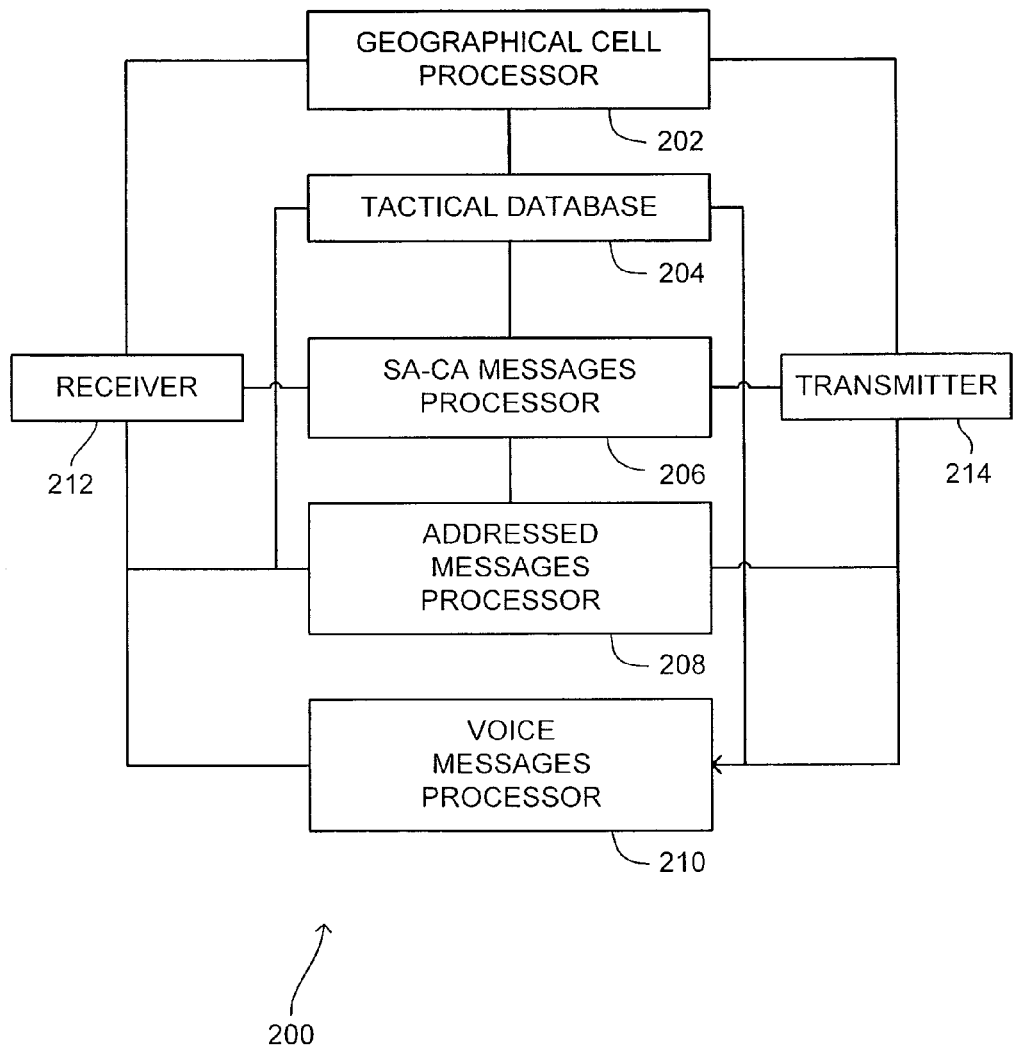
FIG. 4, which is a schematic illustration of a system, generally referenced 200.

Reference is now made to FIG. 4, which is a schematic illustration of a system, generally referenced 200, constructed and operative in accordance with a further embodiment of the disclosed technique. System 200 includes geographical cell processor 202, tactical database 204, SA-CA messages processor 206, addressed messages processor 208 and voice messages processor 210. SA-CA message processor 206 is coupled with tactical database 204, receiver 212 and transmitter 214. Geographical cell processor 202 is coupled with receiver 212 and transmitter 214 and tactical database 204. Addressed messages processor 208 is further coupled with tactical database 204, receiver 212 and transmitter 214. Voice messages processor 210 is coupled with tactical database 204, receiver 212 and transmitter 214. Geographical cell processor 202 performs the transformation from the geographical position of the node, to the position in the reference coordinate system. Thus, Geographical cell processor 202 registers the reference coordinate system with the geographical coordinate system, determines the indices of the current cell of the node and consequently the cell-representative channel. Geographical cell processor 202 further determines the cell-representative the node attempts to receive in the next transmission frame, and determines and maintains the cell-representative status of the node. Geographical cell processor 202 further receives, via receiver 212, cell-representative messages from selected cells and updates tactical database 204 with the information obtained from these messages. When the node is a cell-representative, then, geographical cell processor 202 further determines the next cell-representative of the cell, prepares the cell-representative messages and transmits them via transmitter 214 over the cell-representative channel associated with the cell of the node.

Tactical database 204 stores the partition of the geographical area into cells, the geographical position of said node, the status of said node (i.e., either a cell-member or a cell-representative) and the tactical data of the node. Tactical database 204 further stores the geographical position of other nodes, the status of these other nodes and the tactical data of other nodes which were included in SA messages or cell-representative messages received by the node.

SA-CA message processor 206 updates tactical database 204 when an SA or CA message is received from another node, via receiver 212, maintains a list of the allocated SA transmission channels, and detects transmission collision over the transmission channel. SA-CA messages processor 206 further transmits SA or CA messages via transmitter 214, and manages the selection of transmission channels in which the SA or CA messages are transmitted.

Addressed messages processor 208, determines the next hop node in a route from an addressed message source node to an addressed message destination node, selects the transmission channel in which an addressed message is to be transmitted and informs the next hop node of the addressed message of this transmission channel via a control message. Addressed messages processor 208, further transmits addressed messages via transmitter 214, over the selected channel, receives acknowledgement messages via receiver 212 and retransmits the addressed message when necessary. Addressed messages processor 208, further receives control messages via receiver 212, and when the node is selected as the next hop, attempts to receive messages transmitted over the selected channel (i.e., the channel selected by the transmitting node) and forwards messages, via transmitter 214, to next hop node.

Voice messages processor 210 establishes and terminates a voice channel with another node, either directly of via at least one intermediate node, and transmits digitized voice messages via transmitter 214. Voice messages processor 210, further receives digitized voice messages via receiver 212, over the established link.

Figure 5:
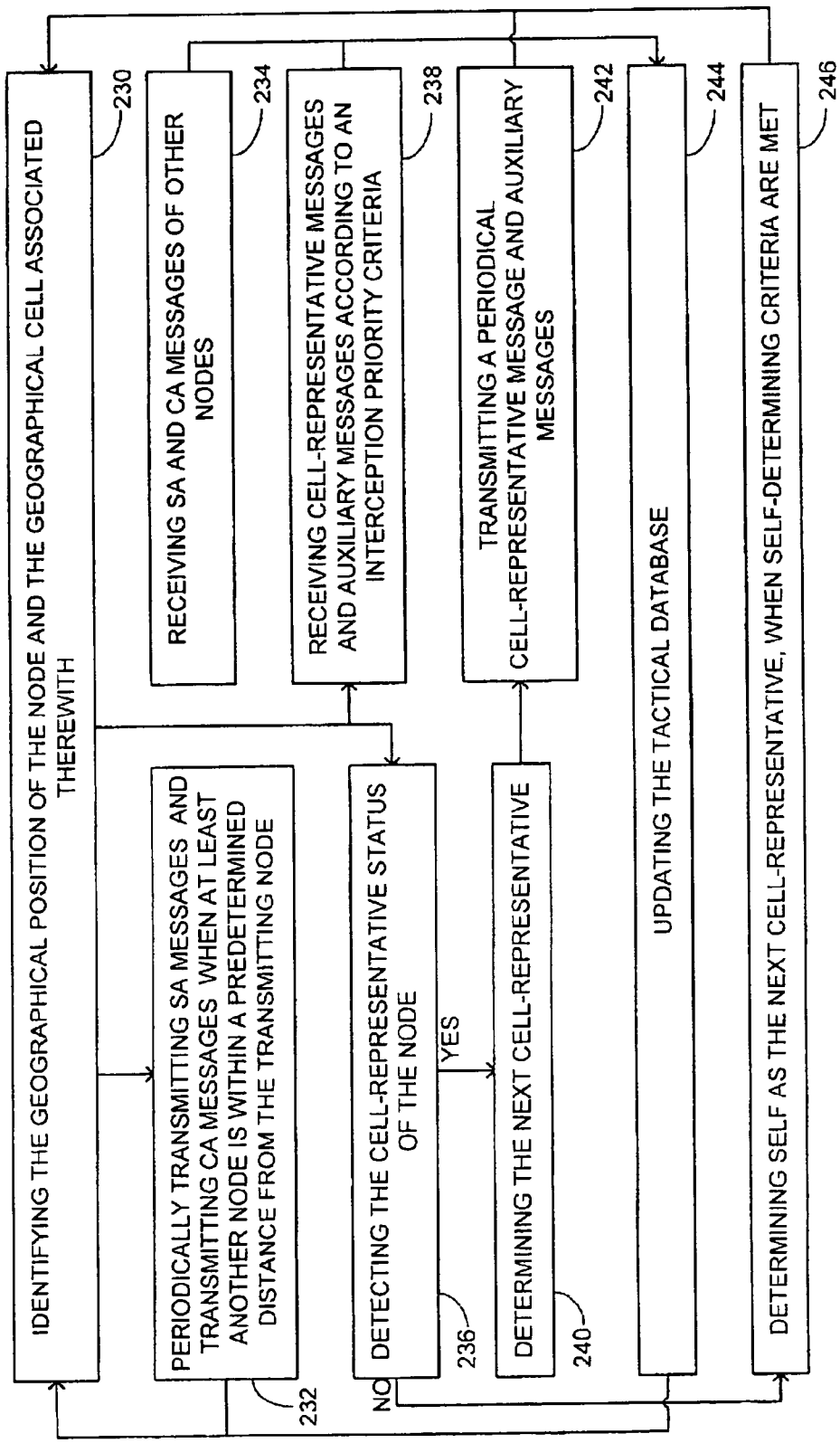
FIG. 5, which is a schematic illustration of a method for operating a single node within the network, to establish and maintain the network topology.

Reference is now made to FIG. 5, which is a schematic illustration of a method for operating a single node within the network, to establish and maintain the network topology, operative in accordance with another embodiment of the disclosed technique. In procedure 230, the current geographical position of the node and the associated cell therewith, is identified. The node determines its current geographical position in the geographical coordinate system (e.g., by obtaining the position from a GPS system, or related systems thereof, such as INS/GPS or WAAS). Consequently, the node identifies the current cell (i.e., the indices of the cell) of the node. The node identifies the current cell according to the correspondence between its geographical position and the geographic coordinates of the cell. With reference to FIG. 4, geographical processor 202 determines the current geographical cell of the node. After procedure 230, the method proceeds to procedures 232, 236 and 238.

In procedure 232, SA messages are transmitted periodically and CA messages are transmitted when at least another node is within a predetermined distance from the transmitting node. SA messages are transmitted at an SA transmission power and at an SA transmission rate (e.g., twice per transmission cycle). CA messages are transmitted at a CA transmission power and at a CA transmission rate (e.g., 10 times per transmission cycle). With reference to FIG. 4, SA-CA messages processor 206 prepares the SA and CA messages and transmits the message via transmitter 214. After procedure 232, the method returns to procedure 230.

In procedure 234, SA and CA messages of other nodes are received. The SA messages enable the receiving node to obtain information about nodes that are within SA range. The CA messages enable the receiving node to obtain information about other nodes that are within a predetermined distance there from, at a high rate. With reference to FIG. 4, SA-CA processor 206 receives SA messages via receiver 212. After procedure 234, the method proceeds to procedure 244.

In procedure 236, the cell-representative status of the node is detected. When the node is a cell-representative, then, the method proceeds to procedures 240 and 242. Otherwise, the method proceeds to procedure 246. With reference to FIG. 4, geographical cell processor 202 detects and maintains the cell-representative status of the node.

In procedure 238, the cell-representative messages and auxiliary messages are received, according to interception priority criteria. If the node is a cell-representative node, then the node receives only the cell-representative messages of other cell-representatives (i.e., a cell-representative can not receive the message of itself). If the node is not a cell-representative, then the node receives the cell-representative messages of the own cell-representative of the node as well. With reference to FIG. 4, geographical cell processor 202 determines which cell-representatives, the node attempts to receive, according to an interception criterion. Geographical cell processor 202 further orders cells that are members of a group formed by an interception criterion according to an ordering criterion. After procedure 238, the method proceeds to procedure to procedure 244.

In procedure 240, the next cell-representative node, is determined. The node, being a cell-representative, determines the cell-representative of the next transmission cycle. A cell-representative node determines another node as a cell-representative, when the following criteria are met:

the cell-representative node is at a distance, larger than a pre-determined threshold, from the center of the cell. (e.g., that pre-determined threshold is half the radius of a circle bounding the cell); and there is another node which is closer to the center of the cell; A cell-representative node maintains cell-representative status (i.e. re-designates itself), when the cell-representative is a cell member (i.e., the node did not leave cell) and one of the following criteria are met:

the node is at a distance, smaller than a pre-determined threshold, from the center of the cell. (e.g., that pre-determined threshold is half the radius of a circle bounding the cell); or there is no other node which is closer to the center of the cell.

With reference to FIG. 4, geographical cell processor 202 determines the cell-representative of the next transmission cycle.

In procedure 242 a periodical cell-representative message and an auxiliary message is transmitted. Cell-representative messages are transmitted at cell-representative transmission power and cell-representative transmission rate over a transmission channel derived from cell identification representation. Cell-representative messages include the identification representation (e.g., ID number) of the cell-representative, the cell-representative tactical data, the identification representation and tactical data of cell-members within the respective cell, and the identification representation and tactical data of cell-members of other cells. These other cells are selected according to a criterion such as the distance from the cell associated with the cell-representative. The cell-representative message includes the identification representation of the cell-representative of the next transmission cycle. Auxiliary messages are transmitted on a transmission channel derived from the from cell identification representation (i.e., indices)]. The auxiliary message contains information on the nodes occupying the cell (e.g. the ID of the cell-representative and of all the remaining nodes in cell). With reference to FIG. 4, geographical cell processor 202 prepares the cell-representative messages and transmits the prepared message via transmitter 214. After procedure 242, the method returns to procedure 230

In procedure 244, the tactical database is updated. With reference to FIG. 4, SA-CA messages processor 206 updates the tactical database according to information received from the SA and CA messages. Geographical cell processor 202 updates the database according to information received from cell-representative messages. After procedure 244, the method returns to procedure 230.

In procedure 246, the node determines itself as the next cell-representative when self-determining criteria are met. It is noted that the term 'next cell-representative' denotes the cell-representative of the next transmission cycle. The self determining criteria are:

the node did not receive a cell-representative message from own cell-representative; and the node did not receive an SA message from own cell-representative node; and the node did not receive an SA message, from a cell-member, that received a cell-representative message; and the node did not receive an SA message from a node that has a better static criterion for cell-representative self-designation (e.g., highest or lowest identification representation number).

With reference to FIG. 4, geographical cell processor 202 determines the node as the cell-representative for the next cycle when self determining criteria are met. After procedure 246, the method returns to procedure 230.

In the system according to the disclosed technique, each node periodically transmits SA messages, over the global transmission frequency. These SA message are transmitted regardless if other nodes are within the SA-range. The node selects an SA-channel, and transmits a Request To Send (i.e., RTS) message. This RTS message is a request to transmit over a specific SA-channel. The RTS message includes a priority the system assigns to the SA-channel request. An RTS may or may not be successful. RTS messages are further explained in conjunction with FIG. 10. When the RTS is determined successful, then, a node transmits the SA messages over the acquired SA-channel, and retains the acquired SA-channel for the next transmission cycles. The node retains the SA-channel until such a situation arises that it must attempt to acquire a different SA-channel. If RTS was not successful, then, the node will receive SA messages of the node that has acquired that SA-channel, and attempts to acquire another SA-channel. Thus, the nodes in this geographical network, self-organize the transmission scheduling of the SA messages.

The system attempts to acquire different SA-channels, when transmission collision is detected on that SA-channel, (i.e., an RTS message of another node is received, on one of the slots of the SA-channel, with the highest priority possible). The system further attempts to acquire different SA-channels, when a transmission collision between hidden nodes is detected on the SA-channel. It is noted that hidden nodes are nodes that are in direct communication with an intermediate node but not in direct communication with each other. Each node further attempts to temporarily allocate a different set of SA-channels, when the SA time slots are required for an addressed message.

Figure 6:
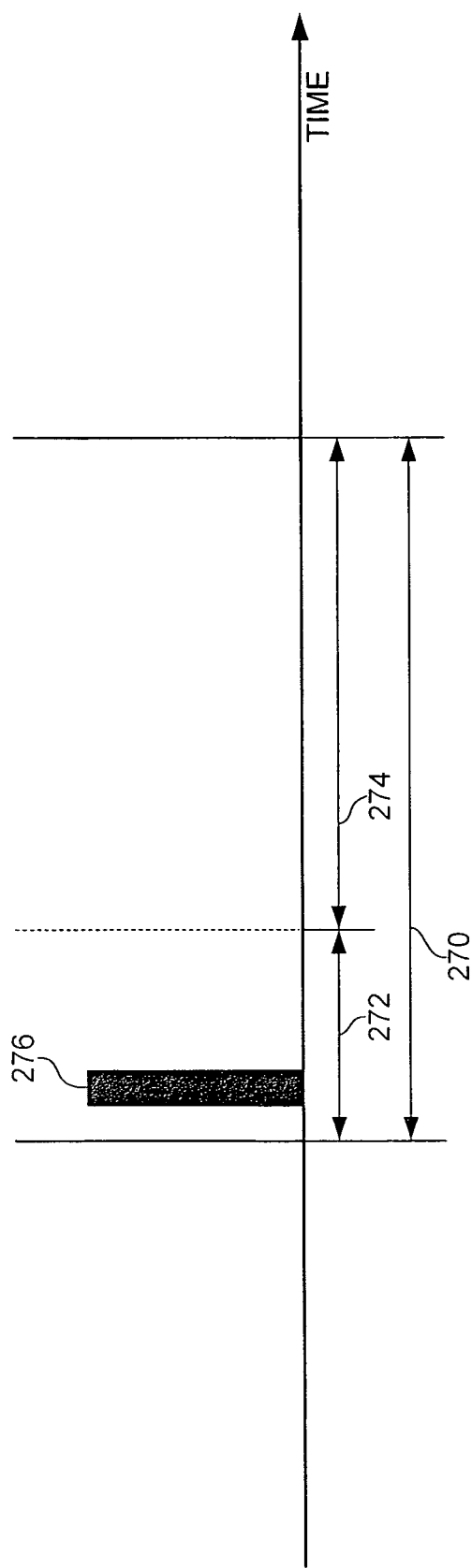
FIG. 6, which is a schematic illustration of an exemplary transmission slot 270 in which an SA message is transmitted.

Reference is now made to FIG. 6, which is a schematic illustration of an exemplary transmission slot 270 in which an SA message is transmitted in accordance with a further embodiment of the disclosed technique. Slot 270 is divided into two intervals, interval 272 and interval 274. Interval 272 is defined as the RTS interval and interval 274 is defined as the data interval. RTS Interval 272 is a predetermined interval in which the system intercepts RTS messages of other nodes and sends its own RTS message 276, when attempting to transmit SA data. This RTS interval is conventionally longer then the time required for transmitting an RTS message. Therefore, more than one RTS message can be received during this interval. The start time of transmitting an RTS message 276 is randomly selected. Consequently, the probability of other nodes, transmitting RTS messages at the same time interval, is reduced. When the RTS is determined successful, then, the node transmits an SA message in data interval 274. When the RTS is determined unsuccessful, then, the node receives SA messages from other node in data interval 274.

Figure 7:
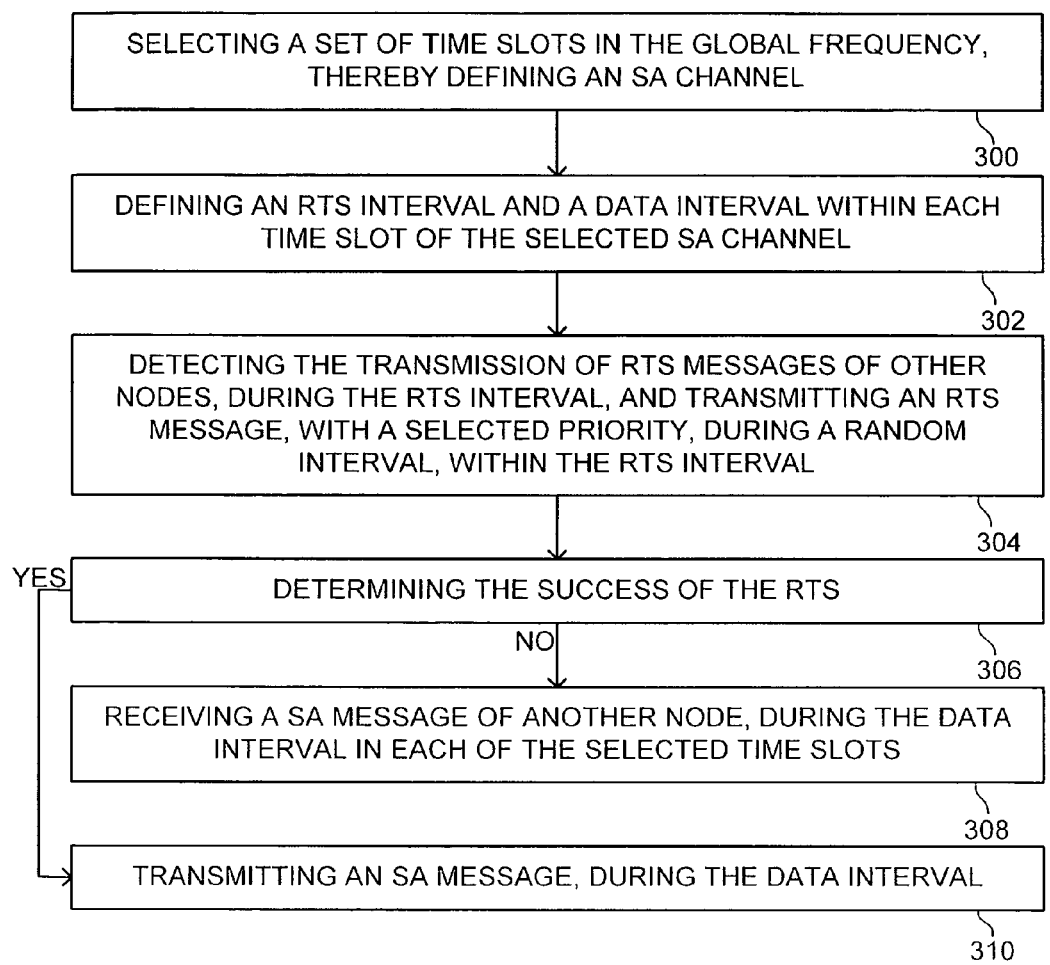
FIG. 7, which is a schematic illustration of a method for transmitting an SA message over an SA-channel in a self-organized manner.

Reference is now made to FIG. 7, which is a schematic illustration of a method for transmitting an SA message over an SA-channel in a self-organized manner, operative in accordance with another embodiment of the disclosed technique. In procedure 300, a set of time slots is selected in the global transmission frequency, thereby defining an SA-channel. Each slot in the set is located in a different frame. This selected set of time slots may be randomly selected, when the node attempts to acquire a new SA-channel. The selected set of slots may further be a retained set of time slots that the node has previously acquired. For example, with reference to FIG. 2, time slots $108_1$ and $108_2$ form an SA-channel. With reference to FIG. 4 SA-CA message processor selects a set of time slots.

In procedure 302, an RTS interval and a data interval are defined within each of the time slots, in the selected transmission channel. With reference to FIG. 6, interval 272 is the RTS interval and interval 274 is the data interval. With reference to FIG. 4, SA-CA messages processor 206 defines within each time slot in the selected transmission channel an RTS interval and a data interval.

In procedure 304, the transmission of RTS messages of other nodes is detected during the RTS interval, and an RTS message including a selected priority, is transmitted during a random interval within the RTS interval. When the node re-uses an SA-channel (i.e., the SA-channel was previously allocated to the node), then the node selects the highest priority possible, thereby retaining the SA-channel. Otherwise, the node selects a random priority, lower than the highest priority possible. By the end of the RTS interval, the node determines if an RTS message, of another node, was transmitted and detects if a hidden terminal exists during that time slot. With reference to FIG. 6, the node detects transmission of RTS messages of other nodes during RTS interval 272. The node further transmits an RTS message 276 during a random interval within RTS interval 272. With reference to FIG. 4, SA-CA processor 206, intercept RTS messages, via receiver 212, and transmits an RTS message via transmitter 214.

In procedure 306, the success of the RTS is determined. Determining if an RTS is successful is further explained in conjunction with FIG. 10. When the RTS is determined successful, then, the method proceeds to procedure 310. When the RTS is determined unsuccessful, then, the method proceeds to procedure 308. With reference to FIG. 4, SA-CA processor 206 determines the success of RTS.

In procedure 308, an SA message of another node is received during the data interval of the time slot. With reference to FIG. 6, the node receives an SA message of another node during the data interval 274. With reference to FIG. 4, SA-CA processor 206 receives via receiver 212 the SA message of another node.

In procedure 310, an SA message is transmitted during the data interval. With reference to FIG. 6, the SA message is transmitted during data interval 274. With reference to FIG. 4, SA-CA processor 206 transmits via transmitter 214 an SA message.

The above description of FIG. 6 and FIG. 7 refers to the transmission of an SA message in an SA-channel. However, the above description relates to the transmission of CA messages in CA-channels as well. The differences being that time slots selected for CA messages are not arranged in sets and these time slots are not retained for future transmissions. When another node or nodes are in close proximity to the transmitting node, then, the transmitting node selects additional time slots in frames not used by the SA-channel, (e.g. additional eight time slots in each cycle). These additional time slots, selected as the CA-channel, are contention time slots. These contention time slots are time slots not used for cell-representative messages, auxiliary messages, control messages, voice and addressed messages, and slots not currently used as an SA-channel. Furthermore, the node transmits CA messages over these slots, according to prioritized contention (i.e., using the RTS with a selected priority). Since the slots selected as the CA-channel are not retained for transmitting CA messages during the next transmission frame, the RTS priority used for CA messages is always less than the maximum priority possible (i.e., the priority reserved for acquired SA channels).

In general, the duration of an SA or CA message transmission is considerably shorter than the data interval (e.g., data interval 274 in FIG. 6). Therefore, two RTS intervals and two data intervals are defined. According to a further embodiment of the disclosed technique, a node divides the time slots of the transmission channel (i.e., SA-channel or CA-channel) into two parts. The node selects one part as the SA transmit (SA-Tx) part, and designates the other part as the SA receive part (SA-Rx). One RTS interval and one data interval are defined within the SA-Tx part. Another RTS interval and another data interval are defined within the SA-Tx part. During the SA-Tx part, the node attempts to transmit the SA or CA message, using the RTS with a selected priority. During SA-Rx part, the node receives RTS messages and SA or CA message of other nodes. The node selects the SA-Tx part at random. As a result, the probability of transmission collision (i.e., two nodes transmitting at the same time) is reduced.

Figure 8:
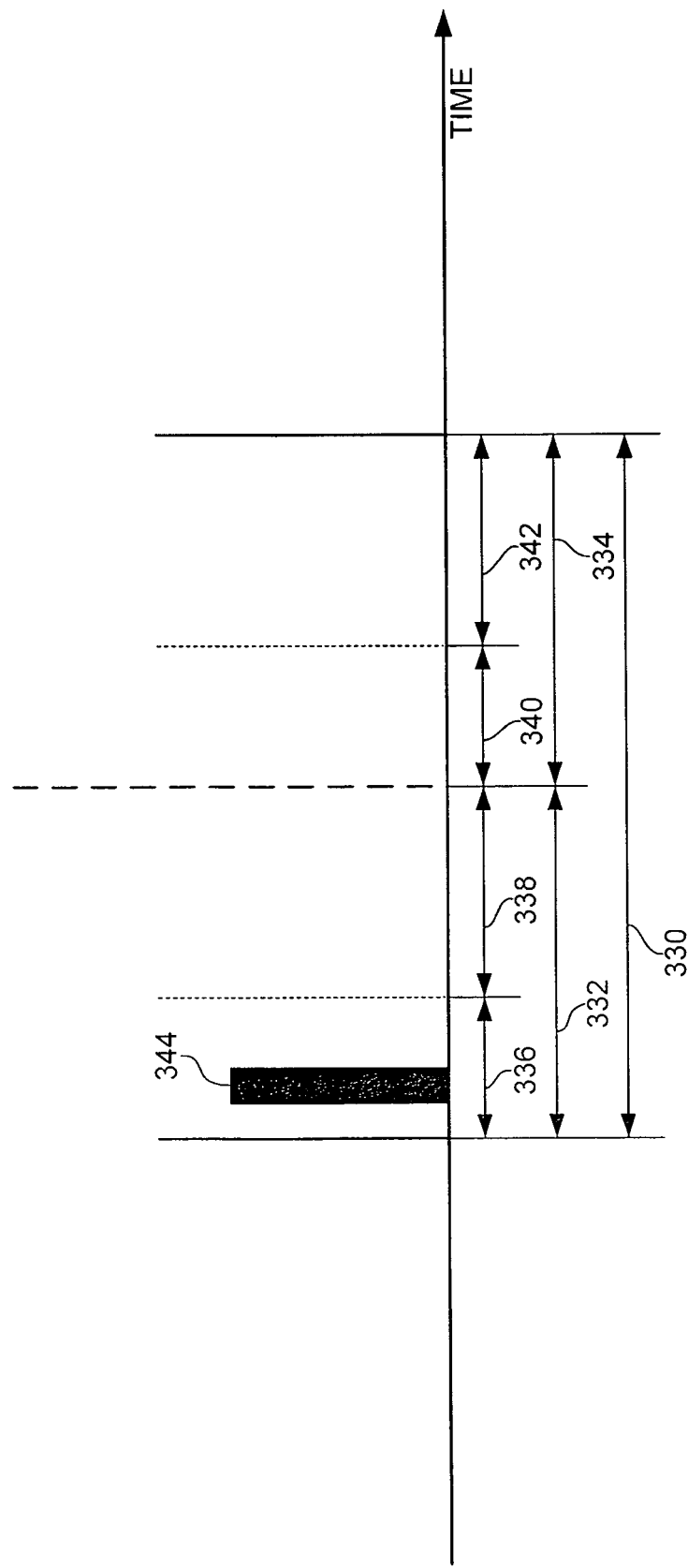
FIG. 8, which is a schematic illustration of an exemplary transmission slot 330 in which a node transmits an SA message.

Reference is now made to FIG. 8, which is a schematic illustration of an exemplary transmission slot 330 in which a node transmits an SA message in accordance with a further embodiment of the disclosed technique. The node divides slot 330 into two parts, interval part 332 and interval part 334. In this example, interval part 332 is selected at random as the SA-Tx part, and interval part 334 is designated SA-Rx part. In each part, the node defines an RTS interval and a data interval. Interval 336 is the RTS interval and interval 338 is the data interval of SA-Tx part 332. Interval 340 is the RTS interval and interval 342 is the data interval of SA-Rx part 334. The node transmits RTS message 344 within RTS interval 336. The start time of transmitting RTS message 344 is randomly selected. When the transmitted RTS is determined successful, then, the node transmits an SA message during data interval 338 and receives SA messages from other node in data interval 334. When the RTS is determined unsuccessful, then, node receives SA messages from other nodes in data intervals 338 and 342.

Figure 9:
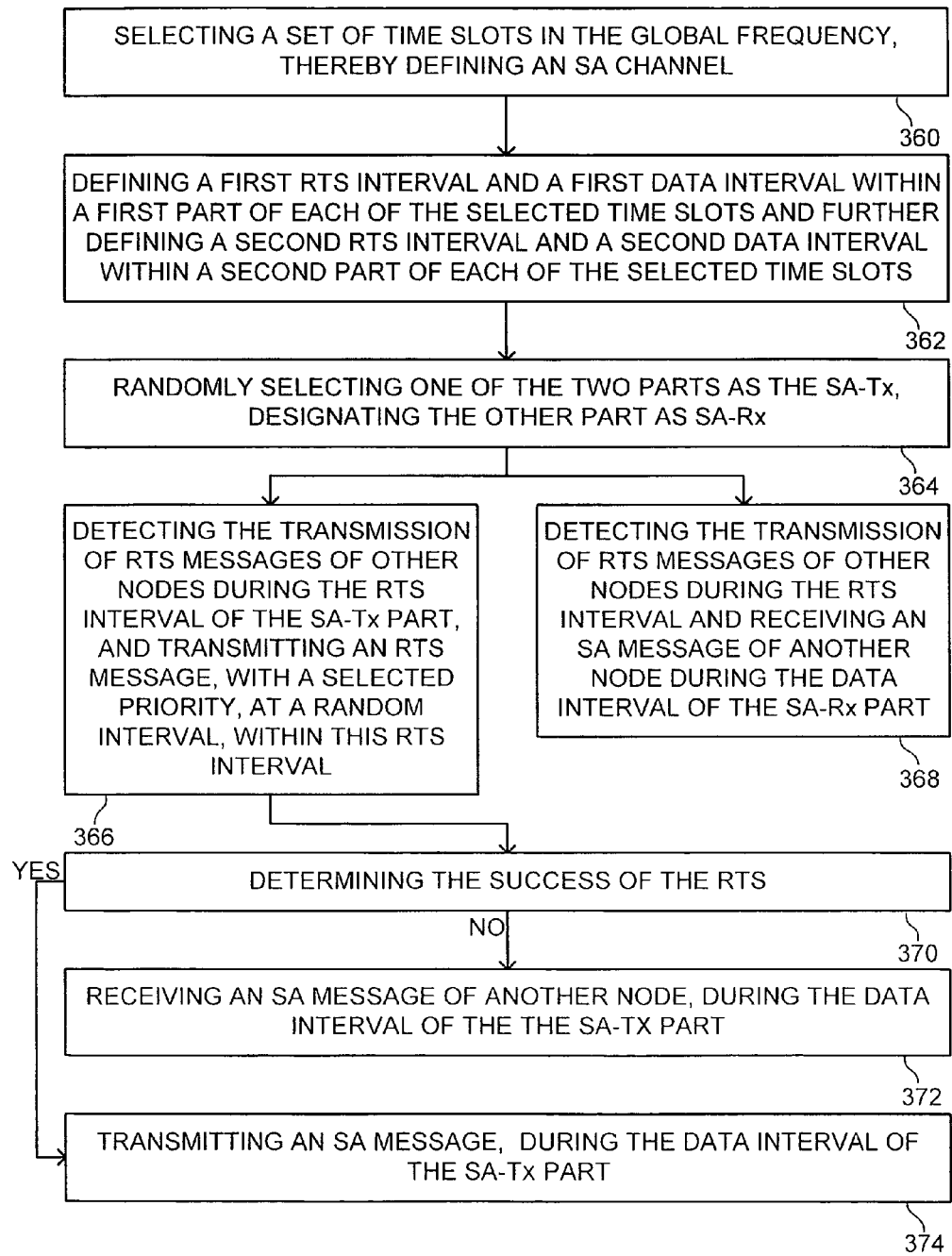
FIG. 9, which is a schematic illustration of a method for transmitting an SA messages over an SA-channel, in a self-organized manner.

Reference is now made to FIG. 9, which is a schematic illustration of a method for transmitting an SA messages over an SA-channel, in a self-organized manner, operative in accordance with another embodiment of the disclosed technique. In procedure 360, a set of time slots is selected in the global transmission frequency, thereby defining an SA-channel. With reference to FIG. 4 SA-CA message processor selects a set of time slots.

In procedure 362, a first RTS interval and a first data interval within a first part of each of the selected time slots are defined, and a second RTS interval and a second data interval within a second part of each of the selected time slots are further defined. With reference to FIG. 8, slot 330 is divided into two parts, interval part 332 and interval part 334. RTS interval 336 is defined as the first RTS interval and data interval 338 is defined as the first data interval within Interval part 332. RTS interval 340 is defined as the second RTS interval and data interval 342 is defined as the second data interval within interval part 334. With reference to FIG. 4, SA-CA messages processor 206 divides each time slot in the selected transmission channel into two intervals.

In procedure 364, one of the two parts is randomly selected as the SA-Tx part and the other part is designated as the SA-Rx part. With reference to FIG. 8, interval part 332 is randomly selected as the SA-Tx part and Interval part 334 is designated as the SA-Rx part. With reference to FIG. 4, SA-CA messages processor 206 randomly selects one of the two parts as the SA-Tx part and designates the other part as the SA-Rx part.

In procedure 366, the transmission of RTS messages of other nodes is detected during the RTS interval of the SA-Tx part, and an RTS message is transmitted, with a selected priority, during a random interval within this RTS interval. With reference to FIG. 8, the node detects transmission of RTS messages of other nodes during RTS interval 336. The node further transmits an RTS message 344 during a random interval within RTS interval 336. With reference to FIG. 4, SA-CA processor 206, intercept RTS messages, via receiver 212, and transmits an RTS message via transmitter 214. The method proceeds to procedure 370.

In procedure 368, the transmission of RTS messages of other nodes is detected during the RTS interval and receiving an SA message of another node during the data interval of the SA-Rx part. During RTS interval of the SA-Rx part, the node detects if a hidden terminal exists. The node determines that a hidden terminal exists when at least two other nodes transmit RTS messages with highest priority possible. With reference to FIG. 8, the node detects transmission of RTS messages of other nodes during RTS interval 340 and receives an SA message of another node during interval 342. With reference to FIG. 4, SA-CA messages processor 206 receives via receiver 214 RTS messages and SA data messages of other nodes.

In procedure 370, the success of the RTS is determined. Determining if an RTS is successful is further explained in conjunction with FIG. 10. When the RTS is determined successful, then, the method proceeds to procedure 374. When the RTS is determined unsuccessful, then, the method proceeds to procedure 372. With reference to FIG. 4, SA-CA processor 206 determines if RTS is successful.

In procedure 372, an SA message of another node is received during the data interval of the SA-Tx part. With reference to FIG. 8, the node receives an SA message of another node during data interval 338 when the RTS was not successful. With reference to FIG. 4, SA-CA processor 206 receives via receiver 212 the SA message of another node.

In procedure 374, an SA message is transmitted during the data interval of SA-Tx part. With reference to FIG. 8, the node transmits the SA message during data interval 338. With reference to FIG. 4, SA-CA processor 206 transmits an SA message via transmitter 214.

The description of FIG. 8 and FIG. 9, refers to the transmission of an SA message in an SA-channel. However, the description relates to the Transmission of CA messages in CA-channels as well, with the above mentioned differences.

Figure 10:
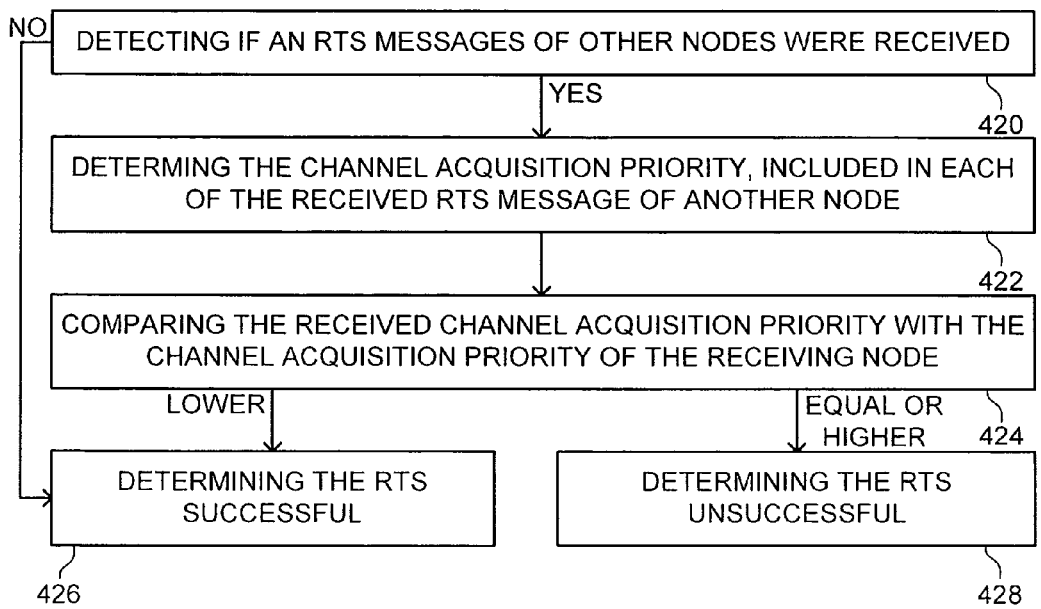
FIG. 10, which is a schematic illustration of a method for determining if an RTS was successful.

Reference is now made to FIG. 10, which is a schematic illustration of a method for determining if an RTS was successful, operative in accordance with a further embodiment of the disclosed technique. In procedure 420 the reception of an RTS message of other nodes is detected. When the reception of an RTS message of another node is detected, then, the method proceeds to procedure 422. When the reception of an RTS message of another node is not detected, then, the method proceeds to procedure 426. With reference to FIG. 6, the reception of an RTS message is detected during interval 272. With reference to FIG. 4, SA-CA messages processor 206 detects if RTS messages of other nodes were received by receiver 212.

In procedure 422, the channel acquisition priority, included in each of the received RTS message, is determined. With reference to FIG. 4, SA-CA messages processor 206 detects the channel acquisition priority, included in each of the received RTS message.

In procedure 424, the received channel acquisition priority is compared with the channel acquisition priority of the receiving node. When the received channel acquisition priority is lower than the channel acquisition priority of the node, then, the method proceeds to procedure 426. When the received channel acquisition priority is not less than the channel acquisition priority of the node, then, the method proceeds to procedure 428. With reference to FIG. 4, SA-CA messages processor 206 compares the received channel acquisition priority with the channel acquisition priority of the receiving node.

In procedure 426, the RTS is determined successful. With reference to FIG. 4, SA-CA messages processor 206 determines the RTS successful.

In procedure 428, the RTS is determined unsuccessful. With reference to FIG. 4, SA-CA messages processor 206 determines the RTS unsuccessful.

An addressed message, is a message that a node transmits specifically to another node or nodes (i.e., the message has a source and a destination). The node, transmitting the addressed message, will be referred hereinafter as the source node. The node, the message is destined to, will be referred to hereinafter as the destination node. A situation may arise, that the source node and the destination node are not in direct communication with each other (i.e., the two nodes cannot receive the transmissions of each other). In such a situation, another node, or nodes, referred to hereinafter as a router node or nodes, relay the message to the destination.

According to the disclosed technique, each node knows the position of all the other nodes in the network. Therefore, when a node (i.e., a source node or a router node) is required to transmit an addressed message to a destination, the node determines the next node on the route of the message to destination. The node (i.e., the source node or the router node currently routing the message), prioritizes the nodes according to the distance from the destination, and selects the next router, using a minimum hops criterion. The node selects the transmission channel, for transmitting the message to the next router, and, the transmission channel for the next router. The node sends a request to establish a link with the next router, via a control channel. The request includes the source address, destination address, the selected transmission channel of the node, and the selected router transmission channel, (i.e., the channel over which the next router should transmit the message). The node determines if the next router transmitted the message, by attempting to receive the message over the selected transmission channel of the next router.

The next router repeats the process described above until the message reaches the destination. The destination node sends a message acknowledging the reception of the message, with the source of the received message as the destination of the acknowledge message. Addressed messages are transmitted at addressed messages power.

Figure 11:
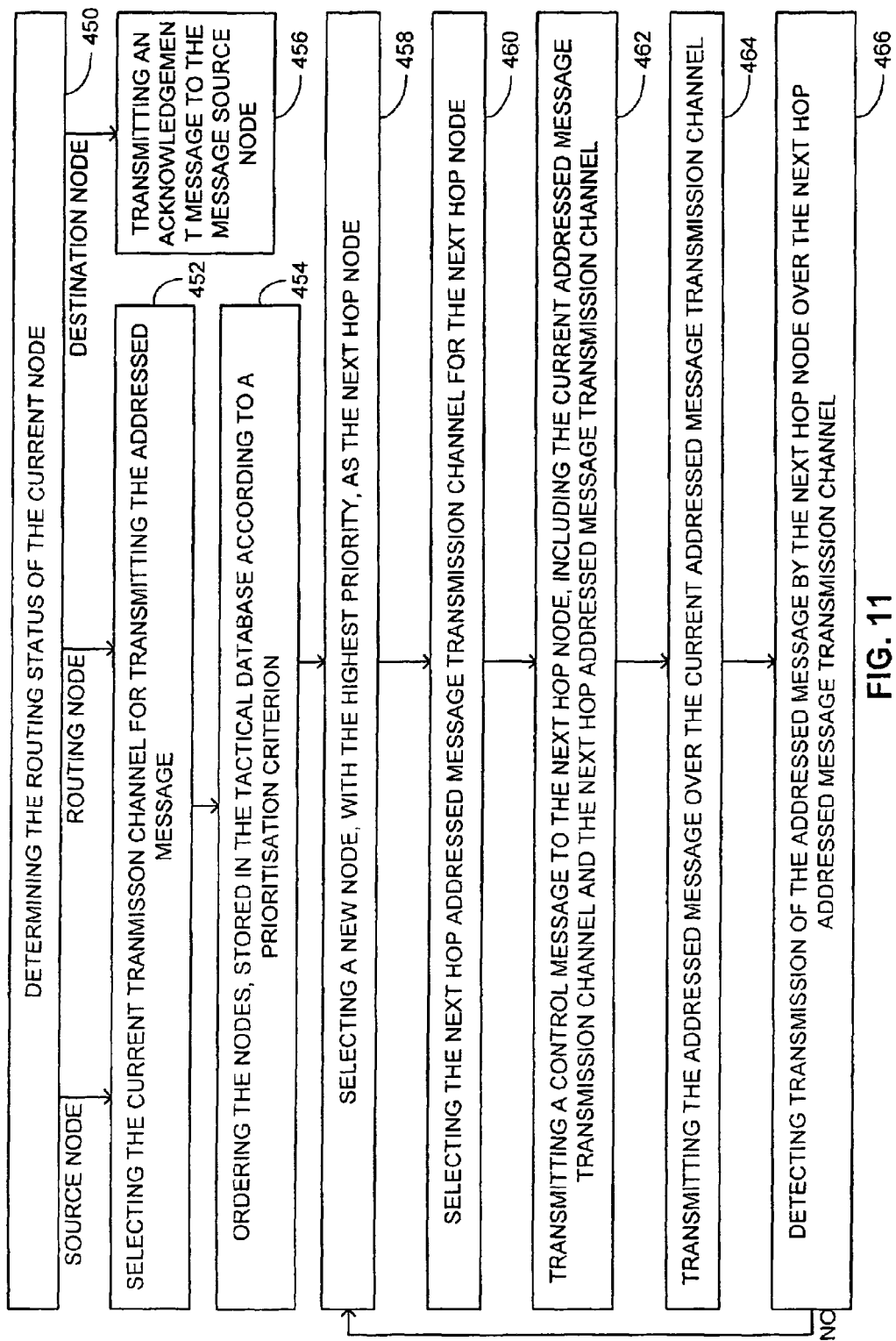
FIG. 11, which is a schematic illustration of a method for transmitting an addressed message from a source to a destination node.

Reference is now made to FIG. 11, which is a schematic illustration of a method for transmitting an addressed message from a source to a destination node in accordance with another embodiment of the disclosed technique. In procedure 450, the routing status of the current node is determined. The current node is one of the nodes, in a route to the message destination node, wherein the message is currently located. The status of the current node may be message-source-node, the message-destination-node or a routing-node. When the status of the current node is the message-source-node, or a routing-node, then, the method proceeds to procedure 452. When the status of the current node is the message-destination-node, then, the method proceeds to procedure 456. With reference to FIG. 4, addressed messages processor 208 determines the routing status of the current node.

In procedure 452, the current transmission channel, for transmitting the addressed message, is selected. This current addressed message transmission channel is the transmission channel, in which the current node (i.e., the node currently forwarding the addressed message) transmits that addressed message. When the routing status of the node is message-source-node, then, the current addressed message transmission channel is selected from available addressed message transmission channels. When the routing status of the node is routing-node, then, the node selects the transmission channel that was determined by the previous node. With reference to FIG. 4, addressed message processor 208 selects the transmission channel for transmitting the addresed message.

In procedure 454, the nodes, stored in the tactical database, are ordered according to a prioritization criterion (e.g., the increasing distance from the destination). With reference to FIG. 4, addressed messages processor 208 prioritizes the nodes stored in tactical database 204 according a prioritization criterion.

In procedure 456, an acknowledgement message is transmitted to the message source node. An acknowledgement message acknowledges the reception of the message by the message destination node. An acknowledgement message is transmitted as an addressed message to the message source node. With reference to FIG. 4, addressed messages processor 210 transmits via transmitter 214 and acknowledgement message to the message source node.

In procedure 458, the node with the highest priority that has not been previously selected, is selected as the next hop node (i.e., either the destination node or a router node). When the source or a router, attempts to transmit the message to another router, and did not succeed, then, the next node in the prioritized list is selected. With reference to FIG. 4, addressed messages processor 208 selects the next node with the highest priority that has not been previously selected as the next hop node.

In procedure 460, the next hop addressed message transmission channel, is selected. This next hop addressed message transmission channel is the transmission channel in which the next hop node will transmit the addressed message. Consequently, the current node can attempt to receive the addressed message transmitted by the next hop node over the selected transmission channel, thus, confirming the forwarding of the message. With reference to FIG. 4, addressed message processor 208 selects an addressed message transmission channel in which the next hop node transmits the message.

In procedure 462, a control message is transmitted to the next hop node. This control message includes the current addressed message transmission channel and the next hop addressed message transmission channel. With reference to FIG. 4, addressed message processor 208 prepares this control message and transmits it via transmitter 214.

In procedure 464, the addressed message is transmitted over the current transmission channel. With reference to FIG. 4, addressed message processor 208 transmits, via transmitter 214, the addressed message over the current transmission channel.

In procedure 466, transmission of the addressed message by the next hop node, over the next hop addressed message transmission channel, is detected. The detection of that transmission of the addressed message over the selected channel, serves as an acknowledgement to the current node that the message was received and forwarded by the next hop node. If transmission of that addressed message, over the selected transmission channel, is not detected, then, the method proceeds to procedure 458. With reference to FIG. 4, addressed messages processor 208 detects via receiver 212 transmission of the message by the next router, over the selected transmission channel of the next router.

A message sent from a single node, to a plurality of specific nodes (i.e., a multicast message), is sent as an addressed message to a distributor. A distributor is a node, that is in direct communication with the destination nodes (i.e., no routers are needed). The distributor sends the message as an addressed message to each of the destinations. The distributor further sends an acknowledgement message to the message source node.

Large messages (e.g., a still picture) are divided into packets and each packet is transmitted as an addressed message. Each packet is transmitted in a plurality of consecutive transmission slots and a selected frequency, according the method described above in conjunction with FIG. 11. Each transmitted packet includes a reference to the message the packet belongs thereto.

The system according to the disclosed technique provides voice communications between nodes. Voice is transmitted in predetermined voice channels (VC). A VC is a plurality of transmission slots and transmission frequencies. A node, requiring voice communication with another node, transmits via a control channel, a request to open a VC. The node, requiring the voice communication, includes in the request, the identification of the selected VC. If a node, with which voice communication is required, is not at the transmission distance of the node requiring the voice communication, then the node transmits the request to a relay node. The relay node selects another VC and transmits, via a control channel, a request to open a VC to the node with which voice communications is required, or to another relay. The node, with which voice communication is required, begins to receive voice messages over the established VC. When voice communications is no longer required, a VC release control message is sent.

It will be appreciated by persons skilled in the art that the disclosed technique is not limited to what has been particularly shown and described hereinabove. Rather the scope of the disclosed technique is defined only by the claims, which follow.

The invention claimed is:

1. A geographical wireless ad-hoc communication network comprising:
a plurality of nodes situated in a geographical area, said geographical area being partitioned into a plurality of geographical cells, each of said geographical cells being associated with respective unique coordinates in a geographical coordinate system, each node including:
a transmitter, transmitting messages over at least one transmission channel;
a receiver, receiving messages over said at least one transmission channel;
a tactical database, storing information relating to the partition of said geographical area into a plurality of geographical cells, said tactical database further storing tactical data respective of said node and tactical data respective of nodes in said network other than said node;
a geographical cell processor, coupled with said transmitter, with said receiver and with said tactical database, for identifying the geographical position of said node in said geographical coordinate system, said geographical cell processor is further operative to associate said node with one of said geographical cells according to said geographical position of said node and said respective unique coordinates of each of said geographical cells;
a situation awareness and collision avoidance messages processor coupled with said transmitter, with said receiver and with said tactical database, for periodically transmitting via said transmitter, situation awareness messages, and for periodically receiving said situation awareness message from nodes other than said node, via said receiver, said situation awareness messages include at least said node identification representation, said node geographical position and said node protocol information;
said node, together with additional ones of nodes other than said node, all associated with a certain one of said geographical cells, being defined as cell members of said geographical cell, one of said cell-members is determined a cell-representative for said geographical cell, said cell-representative transmits cell-representative messages to nodes that are within a determined distance from said cell-representative, said cell-representative messages at least include information relating to said cell-members of said certain one geographical cell, said cell-representative transmits said cell-representative messages over a transmission channel associated with the respective cell thereof, a node receives cell-representative messages of selected cell-representatives.

2. The network according to claim 1, wherein each of said nodes further includes and addressed messages processor, coupled with said transmitter with said receiver and with said tactical database, for transmitting via said transmitter an addressed message to a destination node either directly or via at least one intermediate node and for relaying addressed messages to other nodes when said node is an intermediate node.

3. The system according to claim 2, wherein said addressed message processor transmits an addressed message by:
determining the routing status of said current node, said routing status is selected from the group consisting of:
message-source-node;
routing-node; and
message-destination-node;
selecting a current transmission channel for transmitting said addressed message when said routing status of said node is determined as message-source-node or as routing-node;
ordering said nodes stored in said current node according to a prioritization criterion, when said transmission channel is selected;
selecting a new node with the highest priority, as the next hop node;
selecting a next hop addressed message transmission channel for said next hop node;
transmitting a control message to said next hop node, said control message at least include said current addressed message transmission channel and said next hop addressed message transmission channel;
transmitting said addressed message over said current addressed message transmission channel; and
detecting the transmission of said addressed message by said next hop node over said next hop addressed message transmission channel.

4. The system according to claim 3, wherein, said routing processor further transmits an acknowledgement message to the message source node when said routing status is determined as destination-node.

5. The method system according to claim 3, wherein said prioritization criteria is the distance of said nodes from said destination node.

6. The system according to claim 5, wherein said distance is determined according the geographical position of said current node and said geographical position of said another node.

7. The network according to claim 1, wherein each of said node further includes a voice messages processor coupled with said receiver with said transmitter and with said tactical database for establishing and terminating a voice channel with another node, either directly of via at least one intermediate node, and for transmitting digitized voice messages via said transmitter and for receiving digitized voice messages via said receiver.

8. In a geographical wireless ad-hoc network including a plurality of nodes, a node comprising:
a transmitter, transmitting messages over at least one transmission channel;
a receiver, receiving messages over at least one transmission channel;
a tactical database, storing information relating to a partition of said geographical area into a plurality of geographical cells, each of said geographical cells is associated with respective unique coordinates in a geographical coordinate system, said tactical database further storing tactical data respective of said node and tactical data respective of nodes in said network other than said node;
a geographical cell processor, coupled with said transmitter, with said receiver and with said tactical database, for identifying the geographical position of said node in said geographical coordinate system, for associating said node and said other nodes with a respective one of said geographical cells according to said geographical position of said nodes and said respective unique coordinates of each of said geographical cells, and for determining said node as a cell-representative of the respective geographical cell, for determining the next cell-representative of the respective geographical cell when said node is said cell-representative,
a situation awareness and collision avoidance messages processor coupled with said transmitter, with said receiver and with said tactical database, for periodically transmitting via said transmitter, situation awareness messages, and for periodically receiving said situation awareness message of other said nodes, via said receiver, said situation awareness messages at least include said node identification representation, said node geographical position and said node protocol information;

wherein said geographical cell processor, once determined said node as a cell-representative, transmits via said transmitter a cell-representative message to nodes that are within a determined distance from said node, said cell-representative messages at least include information relating to said node and relating to additional nodes, all being associated with said same respective geographical cell of said node, thereby defining cell-members, said cell-representative transmits said cell-representative messages over a transmission channel associated with the respective cell thereof, said node receives via said receiver cell-representative messages of selected cell-representatives.

9. The node according to claim 8, wherein said node further includes and addressed messages processor, coupled with said transmitter with said receiver and with said tactical database, for transmitting via said transmitter an addressed message to a destination node either directly or via at least one intermediate node and for relaying addressed messages to other nodes when said node is an intermediate node.

10. The node according to claim 9, wherein said situation awareness and collision avoidance messages processor is further coupled with said addressed messages processor, for reallocating said situation awareness transmission channel when an addressed message is transmitted on the allocated said situation awareness transmission channel.

11. The node according to claim 8, wherein said node further includes a voice messages processor coupled with said receiver, with said transmitter and with said tactical database for establishing and terminating a voice channel with another node, either directly of via at least one intermediate node, and for transmitting digitized voice messages via said transmitter and for receiving digitized voice messages via said receiver.

* * * * *